United States Patent [19]

Okada et al.

[11] Patent Number: 5,093,404

[45] Date of Patent: Mar. 3, 1992

[54] MODIFIED POLYPROPYLENE RESIN COMPOSITION

[75] Inventors: Takayuki Okada, Niihama; Tatsuyuki Mitsuno; Takeshi Fujii, both of Chiba; Kentaro Yamaguchi; Mitsuyuki Okada, both of Ichihara, all of Japan

[73] Assignee: Sumitomo Chemical Company, Limited, Osaka, Japan

[21] Appl. No.: 331,369

[22] Filed: Mar. 31, 1989

[30] Foreign Application Priority Data

Mar. 31, 1988 [JP] Japan ................. 63-082036
Mar. 31, 1988 [JP] Japan ................. 63-082037
Mar. 31, 1988 [JP] Japan ................. 63-082038

[51] Int. Cl.$^5$ ............. C08L 33/14; C08L 51/06; C08G 67/02
[52] U.S. Cl. ................... 524/413; 524/426; 524/427; 524/444; 524/451; 524/504; 525/64; 525/166
[58] Field of Search ............ 525/64, 166, 176; 524/413, 426, 427, 449, 451, 504

[56] References Cited

U.S. PATENT DOCUMENTS 4,172,859 10/1979 Epstein .
4,461,871 7/1984 Kometani ............. 525/166
4,780,505 10/1988 Mashita et al. .

FOREIGN PATENT DOCUMENTS 0177151 4/1986 European Pat. Off. ........ 525/64
45-030944 10/1970 Japan .
45-030945 10/1970 Japan .
59-115352 7/1984 Japan .

OTHER PUBLICATIONS

Database WPIL, accession No. 85-214376, Derwent Publications Ltd, London, GB.
Jp-A-60 137 958 (Dainippon Ink) (abstract).

CA 105:79983r, Mashita et al, *Thermoplastic polymer compositions.*

*Primary Examiner*—Patricia Short
*Attorney, Agent, or Firm*—Stevens, Davis, Miller & Mosher

[57] ABSTRACT

The modified polypropylene resin composition of the present invention comprises a blend of
 a resin composition composed of polypropylene type resin (C) selected from the group consisting of a modified polypropylene (A) obtained by graft copolymerizing an unsaturated carboxylic acid or a derivative thereof and an unsaturated aromatic monomer onto a polypropylene, and modified polypropylene (A)/polypropylene (B) composition, and
 a saturated polyester resin (D),
 an epoxy group containing copolymer (E), and
 a basic compound (F) optionally added as a reaction accelerator.

The modified polypropylene resin composition according to the present invention is not only good in molding processability but also markedly effective in that it can give molded products much superior in physical properties to those obtained from individual polymers constituting the thermoplastic resin composition.

The novel modified polypropylene resin composition provided by the present invention can easily be processed into a molded product, a film, a sheet or the like by a molding method usually used for molding thermoplastic resins, for example, injection molding, extrusion molding or the like, giving a product which has a very good balance among stiffness, heat resistance, impact resistance, scratch resistance, coating properties, oil resistance, chemical resistance, water resistance, etc., and is excellent in appearance uniforming and smoothness. It can be advantageously used for a purpose requiring especially high heat resistance and impact resistance, in particular, low-temperature impact resistance.

22 Claims, 1 Drawing Sheet

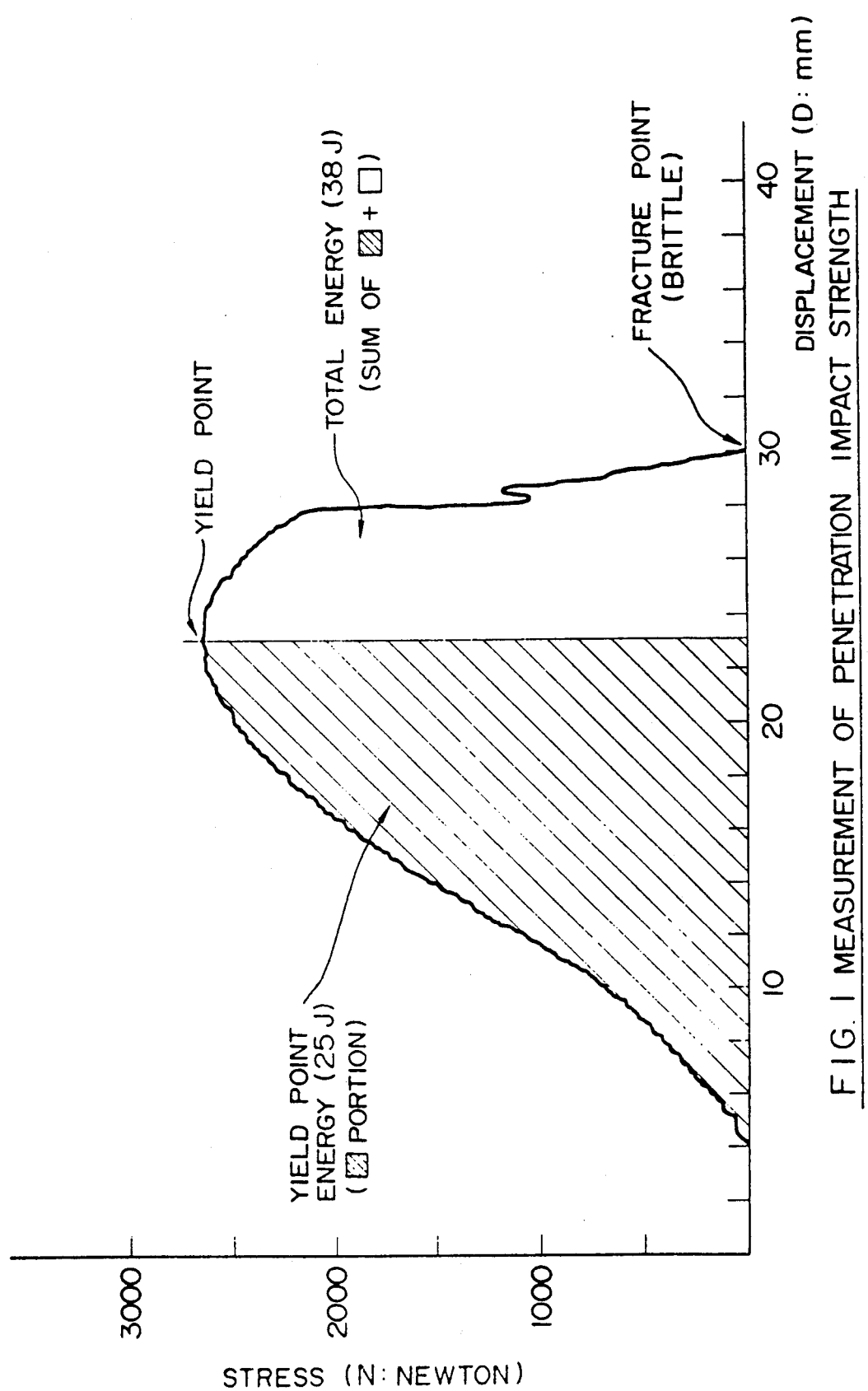

MODIFIED POLYPROPYLENE RESIN COMPOSITION

The present invention relates to a novel modified polypropylene resin composition which can be utilized in the form of molded articles, sheets, films, etc. by means of injection molding, extrusion molding, etc.

More particularly, the present invention relates to a novel modified polypropylene resin composition having excellent balance in physical properties and excellent appearance, which is obtained by blending a polypropylene resin and an saturated polyester resin with an epoxy group containing copolymer, a modified ethylenic copolymer rubber and a basic compound.

BRIEF DESCRIPTION OF THE DRAWING

FIG. 1 shows an example of measurement chart in evaluating the penetration impact strength. The axis of abscissa refers to the degree of deformation of a test piece and the axis of ordinate to stress corresponding to individual values of the degree of deformation. Said measurement chart is obtained by detecting the values of the degree of deformation and the stress continuously and plotting these values on a X-Y plotter continuously.

The yield point energy is determined by integrating the area with respect to the displacement and the stress from the rising of detected stress to the point of yield of a material. The total energy is determined by integrating the area with respect to the displacement and the stress from the rising of detected stress to fracture of the material.

The state of fracture of the material is judged to be ductile fracture (D) or brittle fracture (B) by observing an actual fractured test piece of the material.

Polypropylenes have heretofore been widely used in the form of molded articles, films, sheets, etc. because they are excellent in molding processability, toughness, water resistance, gasoline resistance, chemical resistance, etc., have a low specific gravity, and are not expensive.

They, however, are poor or should be improved in heat resistance, stiffness, impact resistance, scratch resistance, coating properties, adhesive properties, printability, etc., and this defect is an obstacle to opening-up of new avenues of practical use for them.

For improving the coating properties, adhesive properties, printability etc. among the above properties, a method has been devised which comprises subjecting a portion or the whole of a polypropylene to graft modification by the use of an unsaturated carboxylic acid or an anhydride thereof, as disclosed, for example, in JP-B-58-47418 or JP-A-58-49736. However, even the employment of the modified polypropylenes thus obtained does not improve physical properties such as impact resistance, heat resistance and stiffness virtually.

On the other hand, saturated polyester resins are widely used in the fields of automobile parts and electric and electronic parts, as engineering resins characteristic of heat resistance, stiffness, penetration impact resistance, scratch resistance, oil resistance, electric properties, but it is desirable to further improve their molding processability, toughness, notched impact resistance, water resistance, chemical resistance, etc. In addition, they have essential disadvantages in that they have a higher specific gravity and are more expensive than polyolefins.

From such a viewpoint, when by blending a polypropylene type resin selected from modified polypropylenes or compositions composed of modified polypropylenes and polypropylenes with a saturated polyester resin, a thermoplastic resin having the characteristics of both the polypropylene resin and the saturated polyester resin can be obtained, its various new uses can be expected.

However, it has heretofore been considered that the compatibility and dispersability between polypropylene resins and saturated polyester resins are very low. In fact, mere mixing of the above two kinds of resins involves the following problems.

① Barus effect of molten polymer is remarkable, so that stable taking-off of extruded strand is substantially impossible, resulting in a marked lowering of the molding workability.

② There can be obtained only an injection-molded product which has an extreme nonuniformity, has an ugly appearance owing to formation of flow marks, and cannot be used in practice in automobile parts, electric and electronic parts, etc.

③ The mechanical properties, in particular, impact resistance, tensile elongation, etc., of a molded product made of a mixture of a polypropylene resin and a saturated polyester resin often have values lower than those usually expected from the additivity of the respective physical properties of the polypropylene resin and the saturated polyester resin.

Polypropylenes and saturated polyesters are naturally not compatible with each other, but according to the method disclosed in JP-A-61-60746, a polypropylene type resin selected from modified polypropylenes or compositions composed of modified polypropylenes and polypropylenes and a saturated polyester resin can be made compatible with and dispersable in each other by blending an epoxy group containing copolymer with them. Thus, it is possible to produce a thermoplastic resin composition which has a good balance in physical properties such as molding processability, stiffness, heat resistance, impact resistance, scratch resistance, coating properties, oil resistance, chemical resistance, and water resistance, and is excellent in appearance uniforming and smoothness.

However, in the fields of automobile parts, electric and electronic parts, etc., there is a demand for higher heat resistance and higher impact resistance, in particular, higher low-temperature impact resistance. In order to further improve the heat resistance and impact resistance of the thermoplastic resin composition disclosed in JP-A-61-60746, the present inventors earnestly investigated and consequently accomplished the present invention.

According to the present invention, there is provided a modified polypropylene resin composition which comprises a blend of 100 parts by weight of a resin composition composed of 1% to 99% by weight of polypropylene type resin (C) selected from the group consisting of a modified polypropylene (A) obtained by graft copolymerizing an unsaturated carboxylic acid or a derivative thereof and an unsaturated aromatic monomer onto a polypropylene, and modified polypropylene (A)/ polypropylene (B) composition, and 99% to 1% by weight of saturated polyester resin (D), 0.1 to 300 parts by weight of an epoxy group containing copolymer (E), and up to 5 parts by weight of a basic compound (F) optionally added as a reaction accelerator, the content of the saturated polyester resin (D) in the modified polypropylene resin composition being less than 50% by weight.

Additionally, according to the present invention, there is also provided a modified polypropylene resin composition wherein said modified polypropylene resin composition further comprises 0.1 to 300 parts by weight of at least one member selected from the group consisting of an ethylenic copolymer rubber (G), a modified ethylenic copolymer rubber (H) obtained by graft copolymerizing an unsaturated carboxylic acid or a derivative thereof onto an ethylenic copolymer rubber per 100 parts by weight of a resin composition composed of 1% to 99% by weight of polypropylene type resin (C) selected from the group consisting of a modified polypropylene (A) obtained by graft copolymerizing an unsaturated carboxylic acid or a derivative thereof and an unsaturated aromatic monomer onto a polypropylene, and modified polypropylene (A)/polypropylene (B) composition, and 99% to 1% by weight of saturated polyester resin (D).

Furthermore, according to the present invention, there is provided a modified polypropylene resin composition, wherein any of the above modified polypropylene resin compositions further comprises 0.01 to 300 parts by weight of a filler (I) per 100 parts by weight of a resin composition composed of 1% to 99% by weight of polypropylene type resin (C) selected from the group consisting of a modified polypropylene (A) obtained by graft copolymerizing an unsaturated carboxylic acid or a derivative thereof and an unsaturated aromatic monomer onto a polypropylene, and modified polypropylene (A)/polypropylene (B) composition, and 99% to 1% by weight of saturated polyester resin (D).

The polypropylene type resin (C used in this invention is a resin selected from the group consisting of a modified polypropylene (A) and a composition composed of a modified polypropylene (A) and a polypropylene (B).

A detailed explanation of polypropylene are given below. In the present specification, the word "polypropylene" is used as a starting material for the modified polypropylene (A) in some cases and as the polypropylene (B) in other cases.

In this invention, the polypropylene is a crystalline one and includes, for example, propylene homopolymer; block copolymers obtained by polymerizing propylene at the first step and copolymerizing the resulting polypropylene with ethylene and at least one α-olefin such as propylene or butene-1 at the second step; and n and m copolymers obtained by copolymerizing propylene with an α-olefin such as ethylene or butene-1.

The homopolymers, block copolymers or random copolymers can be obtained, for example, by reacting the starting materials in the presence of a chemical complex of a titanium trichloride and an alkylalminum compound which is usually called Ziegler-Natta catalyst.

The polymerization can be carried out at 0° C. to 300° C. However, preferably, the polymerization temperature is carried out usually in the range of 0° C. to 100° C. for example, because above 100° C., highly stereoregular polymerization of an o-olefin such as propylene becomes difficult to yield a polymer having a high stereoregularity.

Although the polymerization pressure is not critical, it is preferably 3 to 100 atmospheres because such a pressure is industrial and economical.

The polymerization can be carried out by a continuous process or a batch process.

As a method for the polymerization, there can be employed slurry polymerization using an inert hydro-, carbon solvent such as butane, pentane, hexane, heptane, or octane; solution polymerization in which the produced polymer is dissolved in the inert hydrocarbon solvent mentioned above; bulk polymerization in which a liquid monomer is polymerized without solvent; and gas phase polymerization in which a gaseous monomer is polymerized.

It is also possible to add a chain transfer agent such as hydrogen in order to control the molecular weight of polymer.

The polypropylene used in this invention can be produced using an isospecific Ziegler-Natta catalyst. The catalyst used herein is preferably one which has a high isospecificity.

Catalysts which can be suitably used are those containing titanium trichloride having a layer crystal structure or a solid complex of a magnesium compound and a titanium compound as the transition metal constituent and an Organoaluminum compound as the typical metal constituent. The catalyst may further contain a well-known electron donative compound as the third component.

Titanium trichloride used can be prepared by reducing titanium tetrachloride with a reducing agent of wide variety. As the reducing agent, metals such as aluminum and titanium, hydrogen, organometal compounds, etc. are known. A typical example of titanium trichloride produced through metal reduction is titanium trichloride composition (TiCl$_3$AA) which is prepared by reducing titanium tetrachloride with metallic aluminum and then pulverizing the reduction product by means of a ball mill or a vibration mill. Owing to the above process, the TiCl$_3$AA contains activated aluminum chlorides. For improving the isospecificity, polymerization activity and/or particle shape of the TiCl$_3$AA, a compound selected from the group consisting of ether, ketones, esters, aluminum chloride, titanium chloride, etc. may be added during the pulverization.

Titanium trichloride more preferable for the object of this invention is one which is obtained by reducing titanium tetrachloride with an organoaluminum compound and subjecting the resulting titanium trichloride composition to catalytic reaction with an ether compound and an halogen compound successively or at the same time. As the ether compound, those having the formula $R^1$-O-$R^2$ (each of $R^2$ and $R^2$ is an alkyl group having 1 to 18 carbon atoms), in particular, di-n-butyl ether and di-t-amyl ether, are preferable. The halogen compound is preferably selected from the group consisting of halogens, in particular, iodine; halogen compounds, in particular, iodine trichloride; titanium halides, in particular, titanium tetrachloride; and halogenated hydrocarbons, in particular, carbon tetrachloride and 1,2-dichloroethane. As the organoaluminum compound, those represented by the formula $AlR^3{}_nX_{3-n}$ ($R^3$ is a hydrocarbon group having 1 to 18 carbon atoms, X is a halogen selected from Cl, Br and I, and n is an integer satisfying the inequality $3 \geq n > 1$), in particular, diethylaluminum chloride and ethylaluminum sesquichloride, are preferable.

Processes for producing such titanium trichloride as mentioned above are disclosed in detail in JP-A-47-34470, JP-A-53-33289, JP-A-53-51285, JP-A-54-11986, JP-A-58-142903, JP-A-60-28405, JP-A-60-228504, JP-A-61-218606, etc.

When titanium trichloride having a layer crystal structure is used as the transition metal compound component, organoaluminum compounds represented by the formula $AlR^4{}_mX_{3-m}$ ($R^4$ is a hydrocarbon group having 1 to 18 carbon atoms, X is a halogen selected from Cl, Br and I, and m is a number in the range $3 \geq m > 0$) are preferable as the typical metal compound component. Organoaluminum compounds particularly preferable for the object of this invention are compounds in which $R^4$ is an ethyl or isobutyl group, and m is a number in the range $2.5 \geq m \geq 1.5$. Specific examples of such compounds are diethylaluminum chloride, diethylaluminum bromide, diethylaluminum iodide, and mixtures of these compounds and triethylaluminum or ethylaluminum dichloride. When the third component described later is co-used, organoaluminum compounds in which m is a number in the range $3 \geq m > 2.5$ or $1.5 \geq m > 0$ can be suitably used for the object of this invention.

The molar ratio of the organoaluminum compound to the titanium trichloride falls within a wide range of 1–1,000 : 1.

The catalyst comprising titanium trichloride and the organoaluminum compound may further contain the third component which is well known. Specific examples of the third component are ε-caprolactam; ester compounds such as methyl methacrylate, ethyl benzoate, and the like; phosphorus acid esters such as triphenyl phosphite, tributyl phosphite, and the like; and the phosphoric acid derivatives such as hexamethylphosphoric triamide, and the like.

Although the amount used of the third component should be experimentally determined for each component because the components exhibit different efficiencies, it is usually used in an amount equimolar with or smaller than the amount of the organoaluminum compound.

When a solid complex of a magnesium compound and a titanium compound is used as the transition metal solid component of the catalyst, organoaluminum compounds, in particular, compounds represented by the formula $AlR^5{}_pX_{3-p}$ ($R^5$ is a hydrocarbon group having 1 to 18 carbon atoms, X is a halogen selected from Cl, Br and I, and p is a number in the range $3 \geq p > 2$), are preferable as the typical metal component of the catalyst. Specific examples of such compounds are triethylaluminum, triisobutylaluminum, and mixtures of these compounds with diethylaluminum chloride or diisobutylaluminum chloride.

It is preferable that the catalyst further contains at least one electron-donating compound, in particular, an aromatic monocarboxylic acid ester and/or a silicon compound having Si-$OR^6$ linkage.

As the silicon compound having Si-$OR^6$ linkage ($R^6$ is a hydrocarbon group having 1 to 20 carbon atoms), preferably used are alkoxysilane compounds represented by the formula $R^7{}_aSi(OR^6)_{4-a}$ (each of $R^6$ and $R^7$ is a hydrocarbon group having 1 to 20 carbon atoms, and a is a number of $0 \leq a \leq 3$). Specific examples of the alkoxysilane compounds are tetramethoxysilane, methyltrimethoxysilane, dimethyldimethoxysilane, ethyltrimethoxysilane, phenyltrimethoxysilane, tetraethoxysilane, methyltriethoxysilane, ethyltriethoxysilane, vinyltriethoxysilane, phenyltriethoxysilane, diphenyldimethoxysilane, diphenyldiethoxysilane, butyltriethoxysilane, tetrabutoxysilane, vinyltributoxysilane, diethyldiethoxysilane, etc.

The electron-donating compound is used preferably in an amount of 1 mole or less, particularly 0.05 to 1 mole per mole of the organoaluminum compound.

As the solid complex of a magnesium compound and a titanium compound, there is used titanium trichloride containing magnesium chlorides which is obtained by reducing titanium tetrachloride with an organomagnesium compound, or one of the so-called "supported catalyst" prepared by subjecting a solid magnesium compound to catalytic reaction with a liquid titanium compound. Preferably, the solid magnesium compound is a compound containing at least one electrondonating compound, in particular, an aromatic monocarboxylic acid ester, an aromatic dicarboxylic acid diester, an ether compound, an alcohol and/or a phenol. The aromatic monocarboxylic acid ester can be added during the catalytic reaction with a titanium compound.

Such solid complexes of a magnesium compound and a titanium compound are described in many official patent gazettes. Catalysts suitable for the object of this invention are described in detail, for example, in JP-A-54-112988, JP-A-54-119586, JP-A-56-30407, JP-A-57-59909, JP-A-57-59910, JP-A-57-59911, JP-A-57-59912, JP-A-57-59914, JP-A-57-59915, JP-A-57-59916, JP-A-54-112982, JP-A-55-133408, JP-A-58-27704, etc.

When the modified propylene resin composition of the present invention encounters such requirements as particularly high heat resistance, stiffness, scratch resistance, etc., it is preferable to use a highly crystalline polypropylene having the following properties: an isotactic pentad of boiling heptane insoluble of propylene homopolymer portion of 0.970 or more, wherein the propylene homopolymer portion refers to the homopolymer portion of polypropylene or the homopolymer portion of propylene block copolymer which has been prepared as the first segment in the first step, of the block polymerization process; a boiling heptane soluble of not more than 5.0% by weight; a 20° C. xylene soluble of not more than 2.0% by weight.

The isotactic pentad of boiling heptane insoluble, boiling heptane soluble and 20° C. xylene soluble are determined as follows.

In 500 ml of boiling xylene is completely dissolved 5 g of polypropylene, and the resulting mixture is cooled to 20° C. and allowed to stand for 4 hours. Then, the mixture is filtered to remove the 20° C. xylen insoluble. The filtrate is concentrated to dryness to evaporate xylene, and the residue is further dried under reduced pressure at 60° C. to obtain a solidified 20° C. xylene soluble. The 20° C. xylene soluble is determined by dividing the dry weight of the solidified 20° C. xylene soluble by the weight of the sample used and it is represented by percent. The above 20° C. xylene insoluble is dried and then extracted with boiling n-heptane in a Soxhlet apparatus for 8 hours. The extraction residue is referred to as boiling heptane insoluble. The boiling heptane soluble is determined by substracting the dry weight of the boiling heptane insoluble from the weight of the sample used (5 g) and dividing the remainder by the weight of the sample used. It is also represented by percent.

Isotactic pentad refers to the fraction of a series of five successive isotactically-sequenced propylene monomer units in the total polymer chain. It is determined based on $^{13}$C-NMR measurements as disclosed in A. Zambelli et al., Macromolecules, 6, 925 (1973). And the NMR absorption peaks are assigned based on the subsequently published Macromolecules, 8, 687 (1975).

Specifically, the isotactic pentad is determined based on the relative ratio of the area of mmmm peaks to the total area of the absorption peaks assigned to methyl carbons. Applying the method to the NPL standard substance CRM No. M19-14 Polypropylene PP/MWD/2 provided by the National Physical Laboratory (United Kingdom) gave an isotactic pentad of 0.944.

The above-mentioned highly crystalline polypropylene can be prepared by any of the methods disclosed in JP-A-60-28405, JP-A-60-228504, JP-A-61-218606, JP-A-61-287917, etc.

When the modified propylene resin composition of the present invention is used for a purpose wherein an impact resistance is required, it is preferable to use a propylene block copolymer, which contains propylene homopolymer portions prepared in the first step as the first segment and block copolymer portions of propylene and an α-olefin such as ethylene and butene-1 prepared in the second step of the block polymerization process as the second segment.

The propylene block copolymer can be prepared by slurry polymerization or gas phase polymerization. When said thermoplastic resin composition is used for a purpose wherein a particularly high impact resistance is required, the amount of the second segment should be increased. In this case, the propylene block copolymer is prepared preferably by gas phase polymerization.

Such a polypropylene having a high impact resistance can be prepared, for example, by the gas phase polymerization disclosed in JP-A-61-287917.

In the propylene block copolymer, the propylene homopolymer portion prepared in the first step of the polymerization may consist of propylene monomer units alone or may consist of propylene monomer units and α-olefin monomer units such as ethylene or an α-olefin having 4 to 6 carbon atoms, wherein the content of the α-olefin monomer units is 6 mole % or less based on the total moles of the monomer units in the polymer produced in the first step. The copolymer portion prepared as the second segment in the second step of the polymerization preferably consists of ethylene monomer units only or consists of propylene monomer units and ethylene monomer units wherein the content of the ethylene monomer units is 10 mole % or more based on the total moles of the monomer units in the polymer produced in the second step or consists of monomer units of propylene, ethylene and an o-olefin having 4 to 6 carbon atoms. The propylene block copolymer contained the polymer produced in the second step in an amount of 10% to 70% by weight based on the weight of the propylene block copolymer.

The content of the second segment for easy and stable production ranges from 10% to 30% by weight for slurry polymerization and from 10% to 70% by weight for gas phase polymerization.

In gas phase polymerization, propylene block copolymers containing large amount of the second segment can be prepared according to the process disclosed in Japanese Patent Application No. 62-256015. Such copolymers are suited for the use wherein an extremely high impact resistance is requested.

Although the intrinsic viscosity of the second segment in tetraline at 135° C. should be changed depending on the production efficiency, physical properties of the product powder, and the intrinsic viscosity of the first segment, it is approximately 3-8 dl/g for slurry polymerization and 1-5 dl/g for gas phase polymerization.

In the present invention, the modified polypropylene (A) can be obtained, for example, by graft copolymerizing graft monomers such as an unsaturated carboxylic acid or a derivative thereof and an unsaturated aromatic monomer onto polypropylene, if necessary, in the presence of a free-radical initiator.

This graft modification of a polypropylene in the presence of an unsaturated aromatic monomer yields a modified polypropylene (A) which has a large amount of the unsaturated carboxylic acid or derivative thereof grafted, a melt flow rate after the graft modification slightly changed from that before the graft modification, and excellent physical properties.

For grafting the graft monomers on a polypropylene, various conventional methods can be employed.

There can be employed, for example, a method comprising mixing polypropylene, graft monomers and a radical generating agent followed by melt-kneading the resulting mixture in a melt-kneading apparatus to graft the graft monomers; a method comprising dissolving polypropylene in an organic solvent such as xylene, adding thereto a radical generating agent under nitrogen, carrying out the reaction with heating and stirring, thereafter cooling the reaction mixture, followed by washing filtration, and drying, and thereby obtaining a graft polypropylene; a method comprising irradiating the polypropylene with ultraviolet light or radiation in the presence of graft monomers; and a method comprising bringing polypropylene into contact with oxygen or ozone in the presence of graft monomers.

In consideration of economical efficiency and the like, it is most preferable to employ a method comprising melt-kneading in a melt-kneading apparatus and thereby carrying out graft copolymerization.

A polypropylene can be melt-kneaded with an unsaturated carboxylic acid or a derivative thereof, an unsaturated aromatic monomer and if necessary, a free-radical initiator at a temperature of 150° C. to 300° C., preferably 190° C. to 280° C. for a residence time of 0.3 to 10 minutes, preferably 0.5 to 5 minutes by means of an extruder, Banbury mixer, kneader, etc. It is industrially advantageous to employ a method in which a modified polypropylene is continuously produced by a single- or twin-screw extruder while keeping the vent holes vacuous and while removing unreacted components (unsaturated carboxylic acid or derivative thereof, unsaturated aromatic monomer, free-radical initiator, etc.), by-products such as oligomers and decomposition products of these components. Although the reaction may be carried out in air, it is preferably carried out in an inert gas such as nitrogen or carbon dioxide. It is also possible to subject the modified polypropylene obtained to heat treatment at a temperature of 60° C. or higher, solvent extraction, and drawing a vacuum with melting.

If necessary, to the modified polypropylene (A) can be added antioxidants, heat stabilizers, light stabilizers, nucleating agents, lubricants, antistatic agents, inorganic or organic colorants, rust preventives, crosslinking agents, foaming agents, plastisizers, fluorescent agents, surface treating agents, surface brighteners, etc. during the modification or the after-treatment.

The unsaturated carboxylic acid used in the modified polypropylene (A) include, for example, acrylic acid, methacrylic acid, maleic acid, itaconic acid, citraconic acid, bicyclo[2,2,1]hepta-5-ene-2,3-di-carboxylic acid (himic acid), bicyclo[2,2,2]octa-5-ene-2,3-dicarboxylic acid, 4-methylcyclohexa-4-ene-1,2-di-carboxylic acid, 1,2,3,4,5,8,9,10-octahydronaphthalen-2,3-dicarboxylic acid, bicyclo[2,2,1]octa-7-ene-2,3,5,6-tetracarboxylic acid, 7-oxabicyclo[2,2,1]hepta-5-ene-2,3-dicarboxylic acid and the like. The derivatives thereof are acid anhydride, esters, amides, imides and metal salts. Specific examples thereof are maleic anhydride, itaconic anhydride, citraconic anhydride, bicyclo[2,2,1]hepta-5-ene-2,3-dicarboxylic acid anhydride (himic acid anhydride: NBDA), monoethyl maleate, monomethyl fumarate, monomethyl itaconate, monomethyl fumarate, dimethylaminoethyl methacrylate, dimethylaminopropyl acrylamide, acrylamide, methacrylamide, maleic monoamide, maleic diamide, maleic N-monoethylamide, maleic N,N-diethylamide, maleic N-monobutylamide, maleic N,N-dibutylamide, fumaric monoamide, fumaric diamide, fumaric N-monoethylamide, fumaric N,N-diethylamide, fumaric N-monobutylamide, fumaric N,N-dibutylamide, maleimide, N-butyl maleimide, N-phenyl maleimide, sodium acrylate, sodium methacrylate, potassium acrylate, potassium methacrylate and the like.

Among then, maleic anhydride is most preferably used.

As the unsaturated aromatic monomer used in the modified polypropylene (A), styrene is most preferable. There can also be used o-methylstyrene, p-methylstyrene, m-methylstyrene, α-methylstyrene, vinyltoluene, divinylbenzene and mixtures thereof.

Although the modified polypropylene (A) can be produced in the absence of a free-radical initiator, it is usually preferably produced in the presence of a free-radical initiator. As the free-radical initiator, well-known ones can be used. The free-radical initiator includes, for example, azo compounds such as 2,2'-azobisisobutyronitrile, 2,2'-azobis(2,4,4-trimethylvaleronitrile) etc.; organic peroxides such as methyl ethyl ketone peroxide, cyclohexanone peroxide, 3,5,5-trimethylcyclohexanone peroxide, 2,2-bis(t-butylperoxy)butane, t-butyl hydroperoxide, cumene hydroperoxide, diisopropylbenzene hydroperoxide, 2,5-dimethylhexane-2,5-dihydroperoxide, di-t-butyl peroxide, 1,3-bis(t-butylperoxyisopropyl)benzene, 2,5-dimethyl-2,5-di(t-butylperoxy)hexane, 2,5-dimethyl-2,5-di(t-butylperoxy)hexyne-3, lauroyl peroxide, 3,3,5-trimethylhexanoyl peroxide, benzoyl peroxide, t-butyl peracetate, t-butylperoxyisobutyrate, t-butylperoxypivalate, t-butylperoxy-2-ethylhexanoate, t-butylperoxy-3,5,5-trimethylhexanoate, t-butylperoxylaurate, t-butylperoxybenzoate, di-t-butyldiperoxyisophthalate, 2,5-dimethyl-2,5-di(benzoylperoxy)hexane, t-butylperoxymaleic acid, t-butylperoxyisopropylcarbonate, polystyrene peroxide and the like.

In producing the modified polypropylene (A), the melt flow rate of a starting polypropylene (a crystalline propylene homopolymer, a crystalline propylene-ethyl-/α-olefin block copolymer, a crystalline propylene-α-olefin random copolymer, or the like) is 0.05-60 g/10 min, preferably 0.1 to 40 g/10 min. The starting polypropylene is preferably chosen so as to adjust the melt flow rate of the resulting modified polypropylene (A) to 0.1-100 g/10 min, preferably 0.5-50 g/10 min. The number average molecular weight of the starting polypropylene is 7,000 to 800,000, preferably 10,000 to 700,000.

In producing the modified polypropylene (A) resin, the blending amounts of the individual constituents are as follows. The amount of the unsaturated carboxylic acid or derivative thereof is preferably 0.01 to 10 parts by weight, more preferably 0.1 to 5 parts by weight per 100 parts by weight of the polypropylene. The amount of the unsaturated aromatic monomer is preferably 0.01 to 10 parts by weight, more preferably 0.1 to 5 parts by weight per 100 parts by weight of the polypropylene. The amount of the free-radical initiator is preferably 0 to 5 parts by weight, more preferably 0.001 to 2 parts by weight per 100 parts by weight of the polypropylene. When the amount of the unsaturated carboxylic acid or derivative thereof is less than 0.01 part by weight, the product has no markedly improved quality. When it exceeds 10 parts by weight, the improvement hits the ceiling and no more remarkable effect is brought about. Moreover, the unsaturated carboxylic acid or derivative thereof remains unreacted in a large amount in the resulting polymer and as a results, offensive smell, deterioration of physical properties, etc. occurs. Therefore, both of such amounts are not desirable for practical purposes. When the amount of the unsaturated aromatic monomer is less than 0.01 part by weight, no marked improving effect is brought about. On the other hand, when it exceeds 10 parts by weight, the improving effect of said monomer hits the ceiling. When the amount of the free-radical initiator exceeds 5 parts by weight, its effect on the graft reaction of the unsaturated carboxylic acid or derivative thereof hits the ceiling. Moreover, the decomposition of the polypropylene becomes so serious that the fluidity (melt flow rate) changes greatly. Therefore, such an amount is not desirable for practical purposes.

In this invention, the polypropylene type resin (C) selected from the group consisting of a modified polypropylene (A) and a composition composed of a modified polypropylene (A) and a polypropylene (B) is preferably one which has a melt flow rate of 0.1-100 g/10 min, particularly preferably 0.5-40 g/10 min.

The saturated polyester resin (D) in the present invention are obtained from dicarboxylic acid components at least 40 mole % of which is terephthalic acid, and diol components. Specific examples of dicarboxylic acid components, other than terephthalic acid, are aliphatic dicarboxylic acids having 2 to 20 carbon atoms, such as adipic acid, sebacic acid, dodecanedicarboxylic acid and the like; aromatic dicarboxylic acids such as isophthalic acid, naphthalenedicarboxylic acid and the like; alicyclic dicarboxylic acids such as cyclohexanedicarboxylic acid and the like; and each or mixtures of those acids. The diol components includes each or mixtures of aliphatic and alicyclic glycols, such as ethylene glycol, 1,3-propanediol, 1,4-butanediol, 1,6-hexanediol, 1,10-decanediol, 1,4-cyclohexanediol and the like.

Among such saturated polyester resins (D), polybutylene terephthalate o polyethylene terephthalate permits more desirable exhibition of the effects of the present invention. The intrinsic viscosity of the saturated polyester resin (D) is preferably in the range of 0.5-3.0 dl/g as measured at 25° C. using o-chlorophenol as a solvent. When a saturated polyester resin (D) having an intrinsic viscosity outside the above range, it tends to be difficult to attain a desired mechanical strength.

The epoxy group containing copolymer (E) in the present invention is a copolymer obtained from an unsaturated epoxy compound and an ethylenic unsaturated compound.

Although the proportions of these compounds for the epoxy group containing copolymer (E) is not critical, the proportion of the unsaturated epoxy compound is 0.1% to 50% by weight, preferably 1% to 30% by weight.

As the unsaturated epoxy compound, any compound may be used so long as it has in the molecule an unsaturated group which permits copolymerization with the ethylenic unsaturated compound and an epoxy group.

The unsaturated epoxy compound includes, for example, unsaturated glycidyl esters and unsaturated glycidyl ethers which are represented by the following formulas (1) and (2), respectively.

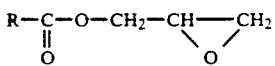

wherein R is a hydrocarbon group of 2-18 carbon atoms containing an ethylenic unsaturated bond.

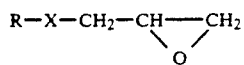

wherein R is a hydrocarbon group of 2-18 carbon atoms containing an ethylenic unsaturated bond, and X is

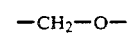

or

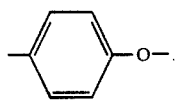

Specific examples of the unsaturated epoxy compound include glycidyl acrylate, glycidyl methacrylate, glycidyl itaconate, allyl glycidyl ether, 2-methyl allyl glycidyl ether, styrene p-glycidyl ether, etc.

The ethylenic unsaturated compound includes olefins, vinyl esters of saturated carboxylic acids of 2-6 carbon atoms, esters of saturated alcohols of 1-8 carbon atoms and acrylic acid, methacrylic acid, maleic acid or fumaric acid, vinylhalodes, styrenes, nitriles, vinyl ethers, acrylamides, etc.

Specific examples of the ethylenic unsaturated compound include ethylene, propylene, butene-1, vinyl acetate, methyl acrylate, ethyl acrylate, methyl methacrylate, dimethyl maleate, diethyl fumarate, vinyl chloride, vinylidene chloride, styrene, acrylonitrile, isobutyl vinyl ether, acrylamide, etc. Among them, ethylene is particularly preferred.

For improving the impact resistance at low temperatures by lowering the glass transition temperature, it is preferable to use ethylene as second monomer and copolymerize a third commoner such as vinyl acetate and/or methyl acrylate.

The epoxy group containing copolymer can be produced by various methods. There can be employed either a random copolymerization method in which the unsaturated epoxy compound is introduced into the main chain of copolymer, or a graft copolymerization method in which the unsaturated epoxy compound is introduced as the side chain of copolymer. Specific examples of production process of the epoxy group containing copolymer include a process comprising copolymerizing the unsaturated epoxy compound with an ethylenic unsaturated compound in the presence of a radical-generating agent at 500 to 4,000 atmospheres and at 100° C. to 300° C. in the presence or absence of suitable solvent and chain transfer agent; a process comprising mixing a polypropylene with the unsaturated epoxy compound and a radical-generating agent, and subjecting the mixture to melt graft copolymerization in an extruder; and a process comprising copolymerizing the unsaturated epoxy compound with the ethylenic unsaturated compound in an inert medium such as water or organic solvent in the present of a radical-generating agent.

In the present invention, ethylenic copolymer rubber (G) and modified ethylenic copolymer rubber (H) which is obtained by graft copolymerizing an unsaturated carboxylic acid or a derivative thereof are used for improving the impact resistance, in particular, the low-temperature impact resistance.

The modified ethylenic copolymer rubber (H) is obtained by graft copolymerizing an unsaturated carboxylic acid or a derivative thereof onto an ethylenic copolymer rubber if necessary, in the presence of a free-radical initiator.

For grafting the graft monomers on the ethylenic copolymer rubber, various conventional methods can be employed.

There can be employed, for example, a method comprising mixing the ethylenic copolymer rubber, the graft monomers, and a free-radical initiator, and melt-kneading the mixture in a melt kneading apparatus to graft the graft monomers; a method comprising dissolving the ethylenic copolymer rubber in an organic solvent such as xylene, adding thereto a free-radical initiator under nitrogen, carrying out the reaction with heating and stirring, thereafter cooling the reaction mixture, followed by washing filtration, and drying, and thereby obtaining a grafted ethylenic copolymer rubber; a method comprising radiating the ethylenic copolymer rubber with ultraviolet light or radiation in the presence of the graft monomers; as method comprising bringing the ethylenic copolymer rubber into contact with oxygen or ozone in the presence of the graft monomers.

In consideration of economical efficiency and the like, the method comprising melt-kneading in a melt-kneading apparatus and thereby carrying out graft copolymerization is most preferably employed Hereinafter the ethylenic copolymer rubber (G) is explained in detail. Said ethylenic copolymer is used as the ethylenic copolymer rubber (G) in some case and used as the starting material of the modified ethylenic copolymer rubber (H) in another case.

As the ethylenic copolymer rubber used in the present invention, there can be used various ethylenic copolymer rubbers for example, ethylene-α-olefin copolymer rubbers or ethylene-α-olefin-nonconjugated diene copolymer rubbers typical example of which are ethylene-propylene copolymer rubbers (hereinafter abbreviated as "EPM") and ethylene-propylene-nonjugated diene copolymer rubbers (hereinafter abbreviated as "EPDM"), ethylene-vinyl acetate copolymers ethylenemethyl acrylate copolymers ethylene-methyl methacrylate copolymers, ethylene-ethyl acrylate copolymers, ethylene-ethyl methacrylate copolymers, ethylene-butyl acrylate copolymers, ethylene-butyl methacrylate copolymers, ethylene-acrylic acid copolymer (or a partial metal salt thereof) ethylene-methacrylic acid (or a partial metal salt thereof) copolymers, ethyleneacrylic acid-acrylic ester copolymers, ethylenemethacrylic acid-acrylic ester copolymers, ethyleneacrylic acid-methacrylic ester copolymers, ethylenemethacrylic acid methacrylic ester copolymers, ethylenevinyl alcohol copolymers, ethylene-vinyl acetate-vinyl alcohol copolymers, ethylene-styrene copolymers, etc. These ethylenic copolymer rubbers can be used alone or as a mixture thereof. They can be used in admixture with low-density polyethylenes or high-density polyethylenes which have a good compatibility with the ethylenic copolymer rubbers.

Among these ethylenic copolymer rubbers, the ethylene-α-olefin copolymer rubbers and the ethylene-α-olefin-nonconjugated diene copolymer rubbers are particularly preferred. The ethylene-α-olefin copolymer rubbers include, for example, copolymers of ethylene and other α-olefin such as propylene, 1-butene, 1-pentene, 1-hexene, 4-methyl-1-pentene, 1-octene, etc., and terpolymer rubbers such as ethylene-propylene-1-butene copolymers etc. Among them, ethylene-propylene copolymer rubber and ethylene-1-butene copolymer rubber are preferably used.

Although the ethylene-o-Olefin-nonconjugated diene copolymer rubbers can also be used, it is preferable to adjust the nonconjugated diene content of the starting rubber to 3% by weight or less. When the nonconjugated diene content exceeds 3% by weight, gelation occurs during kneading. Therefore, it is not desirable.

The ethylene content of the ethylene-α-olefin copolymer rubber is 15% to 85% by weight, preferably 40% to 80% by weight. A highly crystalline copolymer having an ethylene content of more than 85% by weight is apt to become difficult to process under usual rubber molding conditions. On the other hand, an ethylene-α-olefin copolymer rubber having an ethylene content of less than 15% by weight is apt to lose its rubber properties because the glass transition temperature (Tg) increases.

The number average molecular weight of the ethylene-α-olefin copolymer rubber is preferably such that the rubber can be kneaded in an extruder, and it is usually 10,000 to 100,000. When the molecular weight is too low, handling of the rubber at the time of feeding to an extruder tends to be difficult. When the molecular weight is too high, processing of the rubber tends to be difficult because of a lowering of the fluidity.

The molecular weight distribution of the ethylene-α-olefin copolymer rubber is not critical, and there can usually be used any commercially available copolymer rubbers having various molecular weight distributions, for example, monomodal distribution and bimodal distribution.

The Q value (weight average molecular weight/number average molecular weight) of the molecular weight distribution is preferably in the range of 1 to 30, more preferably 2 to 20.

Said copolymer rubber is produced using one of the so-called Ziegler-Natta catalysts which are usually used production catalysts. As the Ziegler-Natta catalyst, there is used, for example, a combination of an organo luminum compound and a trivalent to pentavalent vanadium compound soluble in hydrocarbon solvents. As the aluminum compound, there can be used alkylaluminum sesquichloride, trialkylaluminum, dialkylaluminum monochloride, and mixtures thereof. As the vanadium compound, there can be used, for example, vanadium oxytrichloride, vanadium tetrachloride, and vanadate compound represented by the formula $VO(OR^8)_q X_{3-q}$ ($0 < q \leq 3$, $R^8$ is a straight-chain, branched-chain, or cyclic hydrocarbon having 1 to 10 carbon atoms, and X is a halogen selected from Cl, Br and I).

In this invention, the modified ethylenic copolymer rubber (H) can be obtained by melt-kneading the ethylenic copolymer rubber with an unsaturated carboxylic acid or a derivative thereof, if necessary in the presence of a free-radical initiator at a temperature of usually 200° C. to 280° C., preferably 230° C. to 260° C. for a residence time of 0.2 to 10 minutes, which is varied depending on the kind of the free-radical initiator, by means of an extruder, Banbury mixer, kneader, or the like.

Since the presence of too large an amount of oxygen during the kneading results in formation of a gel or serious coloring in some cases, the kneading is preferably conducted in the substantial absence of oxygen.

When the kneading temperature is lower than 200° C., no desired amount of unsaturated dicarboxylic acid anhydride added can be attained, so that a small improving effect on the degree of graft reaction can be obtained in some cases. When the kneading temperature is higher than 280° C., only small improving effect on the degree of graft reaction is brought about and in some cases, formation of a gel, coloring etc. are liable to occur.

Although a kneading machine for the modification is not critical, an extruder is usually preferred because it permits continuous production. The extruder preferably have a single screw or twin screws which are suitable for uniformly mixing fed starting materials.

For removing unreacted constituents (unsaturated carboxylic acid or derivative thereof, free-radical initiator, etc.), by-products such as their oligomers and decomposition products from the reaction products, the product can be purified by sucking through vent lines in the middle of the extruder or near its outlet by means of a vacuum pump, or by dissolution of the product in a suitable solvent, followed by decomposition. It is also possible to conduct heat treatment at a temperature of 60° C. or higher, or draw a vacuum with melting. Although the above three components, can be separately fed to a kneading machine, it is also possible to use a previously prepared uniform mixture of some or all of the three components. For example, there can be employed a method which comprises impregnating the rubber with the free-radical initiator, feeding the rubber, unsaturated carboxylic acid or derivative thereof and the like at the same time at the time of kneading, and kneading them. There can also be employed, for example, a method which comprises feeding the free-radical initiator and/or the unsaturated carboxylic acid or derivative thereof in the middle of the extruder, and thereby conducting modification.

If necessary, to the modified ethylenic copolymer rubber (H) can be added antioxidants, heat stabilizers, light stabilizers, nucleating agents, lubricants, antistatic agents, inorganic or organic colorants, rust preventives, crosslinking agents, foaming agents, plastisizers, fluorescent agents, surface treating agents, surface brighteners and the like during the modification or the aftertreatment.

The unsaturated carboxylic acid or derivative thereof, and the free-radical initiators which are used in the modified ethylenic copolymer rubber (H) can be selected from the compounds used for producing the modified polypropylene (A).

In producing the modified ethylenic copolymer rubber (H), the using amount of either the unsaturated carboxylic acid or derivative thereof is preferably 0.5~15 parts by weight per 100 parts by weight of the starting rubber.

Although the using amount of the free-radical initiator depends on the kind thereof and the kneading conditions, the free-radical initiator can be used in an amount of usually 0.005 to 1.0 parts by weight, preferably 0.01 to 0.5 parts by weight, per 100 parts by weight of the starting rubber. When the using amount is less than 0.005 parts by weight, it is difficult to attain a desirable amount of the unsaturated carboxylic acid or derivative thereof added. When the using amount exceeds 1.0 parts by weight, formation of a gel tends to occur.

The modified ethylenic copolymer rubber (H) thus obtained preferably has an amount of the unsaturated carboxylic acid or derivative thereof added of 0.1% to 5% by weight, and a Mooney viscosity ($ML_{1+4}$, 121° C.) of 5 to 120.

In producing the modified polypropylene resin composition of the present invention, a basic compound (F) can be added for accelerating the reaction of the graft copolymerized unsaturated carboxylic acid or derivative thereof in the modified polypropylene (A) and the modified ethylenic copolymer rubber (H) with the epoxy group in the epoxy group containing copolymer (E), and the reaction of the unreacted terminal carboxylic acid of the saturated polyester resin (D) with the epoxy group in the epoxy group containing copolymer (E).

The addition of the basic compound (F) permits reduction of the reaction time and hence the time required for the production is shortened.

As the basic compound (F), there are preferably used, for example, amine type organic compounds such as benzyldimethylamine, 2,4,6-tris(dimethylaminoethyl)-phenol, etc.

In producing the modified polypropylene resin composition, the reaction may be carried out by adding these basic compounds themselves, or the reaction may be carried out by adding them in the form of a master batch prepared by previously dispersing them to a high concentration in a portion of the resin constituents or a resin compatible with the modified polypropylene resin composition in order to improve the dispersion.

In this invention, in producing the modified polypropylene resin composition, a filler (I) can be blended for reinforcement, impartment of functions, extension (reduction of the cost), etc.

As the filler (I), there can be used fibers such as glass fiber, carbon fiber, polyamide fiber, metal fibers of aluminum, stainless steel and the like, metal whiskers, etc., inorganic fillers such as silica, alumina, calcium carbonate, talc, mica, clay, kaolin, carbon black, $TiO_2$, ZnO, $Sb_2O_3$, etc.

All of these fillers can be used for reinforcement. Fillers such a carbon fiber, metal fibers and carbon black can lower the surface resistivity and the volume resistivity and impart electrical conductivity to the modified polypropylene resin composition of the present invention. The cost can be reduced by using a filler more inexpensive than the resins as an extender.

For improving stiffness and heat resistance of the modified polypropylene resin composition of the present invention, it is particularly preferable to use as the filler (I), an inorganic filler such as glass fiber, potassium titanate whisker, talc, mica, calcium carbonate or the like.

One preferable embodiment of the present invention is to use the modified propylene resin composition of the present invention in the form of composite materials obtained by further adding flame retardants or flame-retarding assistants, lubricants, nucleating agents, plasticizers, dyes, pigments, antistatic agents, antioxidants, weather resistance improvers, etc.

In the modified polypropylene resin composition of the present invention, the polypropylene type resin (C) is contained in an amount of 1% to 99% by weight, preferably 15% to 98% by weight, based on the weight of the resin composition. When the content of the polypropylene type resin (C) is less than 1% by weight, the molding processability, stiffness, water resistance, chemical resistance, and the like are not sufficient.

When a composition composed of a modified polypropylene (A) and a polypropylene (B) is used as the polypropylene type resin (C), the modified polypropylene (A) is preferably contained in the composition in an amount of 5% by weight or more based on the weight of the composition. When the content is less than 5% by weight, the final resin composition is poor in compatibility and dispersibility, and sufficient toughness and impact resistance cannot be attained in some cases. Moreover, improvement of the coating properties, adhesive properties, printability and the like are not sufficient in some cases.

In the whole modified polypropylene resin composition, the saturated polyester resin (D) is contained in an amount of less than 50% by weight, preferably 2% to 45% by weight, more preferably 5% to 40% by weight, based on the weight of the modified polypropylene resin composition. The saturated polyester resin (D) has an improving effect on the heat resistance, stiffness, impact resistance and the like, but when its content exceeds 50% by weight, there cannot be attained desirable molding processability, stiffness, water resistance, chemical resistance and the like. Furthermore, the specific gravity is increased and the cost is raised.

In the present invention, the epoxy group containing copolymer (E) is blended in an amount of 0.1 to 300 parts by weight, preferably 1 to 200 parts by weight, more preferably 2 to 150 parts by weight, per 100 parts by weight of the resin composition composed of the polypropylene type resin (C) and the saturated polyester resin (D). When the blending amount is less than 0.1 parts by weight, the modified polypropylene resin composition is poor in compatibility and dispersibility. Moreover, the toughness and the impact resistance are not sufficient and the extrusion stability is low. When it is 100 parts by weight or more, the resulting modified polypropylene resin composition is useful as a thermoplastic elastomer, but when the blending amount exceeds 300 parts by weight, the toughness, heat resistance and the like are greatly deteriorated and no desirable result can be obtained.

The amount of the basic compound (F) used as reaction accelerator in the modified polypropylene resin composition of the present invention is 0 to 5 parts by weight, preferably 0.01 to 2 parts by weight, per 100 parts by weight of the resin composition composed of the polypropylene type resin (C) and the saturated polyester resin (D). When the intensity of kneading is sufficient and the residence time in a kneading machine is sufficient for the reaction, the basic compound (F) need not to be blended. When the amount exceeds 5 parts by weight, a marked reaction accelerating effect is brought about, but the appearance and smell of molded article are very inferior because of bleeding and the like, and no desirable result can be obtained.

In the modified polypropylene resin composition of the present invention, at least either ethylenic copolymer rubber (G) or the modified ethylenic copolymer rubber (H) used for improving impact resistance, in particular, low-temperature impact resistance, is added onto resin composition comprising the polypropylene resin (C) and the saturated polyester resin (D) by the ratio of 0.1 to 300 parts by weight, preferably 1 to 200 parts by weight per 100 parts by weight of the resin composition. When its addition is 100 parts or more, the resulting modified polypropylene resin composition is useful as a thermoplastic elastomer, but if its addition is less than 0.1 part by weight, impact-resistance is not improved. If it is more than 300 parts by weight, both toughness and heat-resistance are markedly reduced and thus preferred results cannot be given.

In the modified polypropylene resin composition, these two sorts of rubber can be used for improving impact-resistance respectively. Although the modified ethylenic copolymer rubber (H) has the improving effect of impact-resistance more than the ethylenic copolymer rubber (G), the polymer of high molecular weight resulted from the reaction reduced the fluidity. Accordingly, in order to improve impact-resistance and to maintain a certain level of fluidity, the ethylenic copolymer rubber (G) can be mixed together with.

In the modified polypropylene resin composition containing a filler of the present invention, the filler (I) used for reinforcement, impartment of functions, extension (reduction of the cost), etc. is blended in an amount of 0.01 to 300 parts by weight, preferably 1 to 200 parts by weight, per 100 parts by weight of the resin composition of the polypropylene type resin (C) and the saturated polyester resin (D). When the amount of the filler (I) is less than 0.01 part bu weight, no filling effect can be obtained. When it exceeds 300 parts by weight, the toughness and the impact resistance are deteriorated and the intrinsic characteristics of the resins are lost, resulting in a brittle product. Thus, no desirable result can be obtained.

A method for producing the modified polypropylene resin composition of the present invention is not critical and conventional methods can be used.

Although a method comprising mixing the starting materials in solution followed by evaporation of the solvent or precipitation in a non-solvent is effective, a method comprising kneading the starting materials in molten state is employed in practice from an industrial viewpoint. For the melt-kneading, there can be used conventional kneading apparatus such as Banbury mixer, extruder, roll mill, various kneaders, etc.

In the kneading, it is preferable to mix the resin components all in the form of powder or pellets uniformly and previously in an apparatus such as tumbler or Henschel mixer. If necessary, it is also possible to omit the mixing and feed predetermined amounts of the resin components to a kneading apparatus individually.

When the basic compound for accelerating the reaction is used in the form of powder or master batch, either of the methods described above can be employed. When the basic compound is a liquid, it is preferable to mix the resin components previously in a tumbler or a Henschel mixer, but it is also possible to equip a kneading apparatus with a metering pump and add the liquid through a piping.

The kneaded resin composition is molded by various molding methods such as injection molding, extrusion molding, etc. The present invention also includes a method in which the starting materials are dry blended during injection molding or extrusion molding without a step of previous kneading, and kneaded directly during melt processing to obtain a molded product.

In the present invention, the order of kneading is not critical, and any of the following orders may be employed. (1) The modified polypropylene (A), the polypropylene (B), the saturated polyester (D), the epoxy group containing copolymer (E), the basic compound (F) at least either the ethylenic copolymer rubber (G) or the modified ethylenic copolymer rubber (H) and the filler (G) are kneaded in one lot. (2) The modified polypropylene (A) and the polypropylene (B) are previously kneaded to produce the polypropylene type resin (C), followed by kneading therewith the saturated polyester resin (D), the epoxy group containing copolymer (E), the basic compound (F), at least either the ethylenic copolymer rubber (G) or the modified ethylenic copolymer rubber (H) and the filler (I). (3) The polypropylene type resin (C) and the saturated polyester resin (D) are previously kneaded, followed by kneading therewith the epoxy group containing copolymer (E), the basic compound (F) at least either the ethylenic copolymer rubber (G) or the modified ethylenic copolymer rubber (H) and the filler (I). Other kneading orders may also be employed. However, when the modified polypropylene (A) and the epoxy group containing copolymer (E); the epoxy group containing copolymer (E) and the modified ethylenic copolymer rubber (H); or the saturated polyester resin (D) and the epoxy group containing copolymer (E), are previously blended, gelation occurs during the kneading in some cases, depending on the proportions of the two components of each combination. In this case it is necessary to choose the proportions of the two components properly and knead them previously.

In order to further simplify the kneading step, a step of previously producing the modified polypropylene (A) and the modified ethylenic copolymer rubber (H) can be incorporated into a kneading step for producing the modified propylene resin composition of the present invention.

That is, the modified propylene resin composition can be produced by co-modifying the starting polypropylene and the starting ethylenic copolymer rubber in the first stage, and adding either the modified polypropylene (A) or the modified ethylenic copolymer rubber (H), the polypropylene (B), the saturated polyester resin (D), the epoxy group containing copolymer (E), the ethylenic copolymer rubber (G) the basic compound (F) and the filler (I) to the co-modified products in molten state.

For producing the modified propylene re in composition of the present invention more effectively, it is preferable to use a high-kneading twin screw extruder having a long L/D ratio and two or more feed openings. That is, the modified polypropylene resin composition can be efficiently produced by feeding the starting materials for co-modification through the first feed opening, modifying them sufficiently before feeding the constituents other than the modified polypropylene (A) and the modified ethylenic copolymer (H), through the next feed opening, feeding the other constituents properly through the second and subsequent feed openings.

For desirable exhibition of physical properties of the modified polypropylene resin composition of the present invention, various kneading methods, for example, the following methods can be employed. For satisfactory exhibition of the impact resistance, there can be employed a method comprising kneading a portion of the epoxy group containing copolymer (E) with the saturated polyester resin (D), followed by kneading therewith the other constituents. For more effective reinforcement with the filler (I) and satisfactory exhibition of the stiffness and the head resistance, there can be employed a method comprising kneading the filler (I) with one resin constituent which constitutes the modified polypropylene resin composition of the present invention and permits satisfactory dispersion therein of the filler (I), and then kneading therewith the other constituents; and a method comprising adding the filler (I) to the resin composition which has previously been melt-kneaded, in the middle of an extruder, and then kneading them. For efficient exhibition of the reaction-accelerating effect of the basic compound (F), there can be employed a method comprising preparing a master bath previously by dispersing the basic compound (F) in one resin constituent which constitutes the modified polypropylene resin composition of the present invention, or in a resin compatible with said modified polypropylene resin composition, to a high concentration, and then kneading the master batch with the other constituents. In order to preferably exhibit the properties of the modified polypropylene resin composition of the present invention, various methods of kneading can be adopted.

The following examples serve to give specific illustration of the practice of the present invention but they are not intended in any way to limit the scope of the present invention.

Methods for measuring the physical properties in the examples are described below.

(1) Specific gravity

Measured according to the method prescribed in JIS K6758.

(2) Melt flow rate

Measured according to the method prescribed in JIS K6758. The measuring temperature was 230° C. and the measurement was carried out under a load of 2.16 kg unless otherwise specified.

(3) Tensile test

Carried out according to the method prescribed in ASTM D638. The thickness of a test piece was 3.2 mm, and the tensile yield strength and the tensile elongation were evaluated. The measuring temperature was 23° C. , unless otherwise specified.

(4) Flexural test

Carried out according to the method prescribed in JIS K7203. The thickness of a test piece was 3.2 mm, and the flexural modulus and the flexural strength were evaluated under conditions of a span length of 50 mm and a loading rate of 1.5 mm/min. The measuring temperature was 23° C. unless otherwise specified. When the measurement was carried out at temperature other than 23° C., the sample was subjected to the measurement after having been conditioned in a constant temperature bath at a predetermined temperature for 30 minutes.

(5) Izod impact strength

Measured according to the method prescribed in JIS K7110. The thickness of a test piece was 3.2 mm and the notched impact strength was evaluated. The measuring temperature was 23° C. unless otherwise specified. When the measurement was carried out at a temperature other than 23° C., the sample was subjected to the measurement after having been conditioned in a constant temperature bath at a predetermined temperature for 2 hours.

(6) Penetration impact strength

A high rate impact rester [Model RIT-800, mfd. by Rheometrics Inc. (USA)]was used. A flat test piece of 3 mm thickness was fixed by means of a 2-inch circular holder and a ⅜-inch (tip spherical surface: 5/16 inch R) impact probe was hit against the test piece. The degree of deformation of the test piece and the stress were measured by means of the tester, and the curve shown in FIG. 1 was drawn based on the measured values. The penetration impact strength was evaluated by integrating the area along the curve.

An energy value required for yield of the material and an energy value required for fracture of the material were evaluated in terms of energy at the yield point and the total energy, respectively. Both of them are expressed in joule (J).

The sample was conditioned in a constant temperature bath attached to the apparatus. The test piece was placed in a constant temperature bath previously adjusted to a predetermined temperature, conditioned for 2 hours, and then subjected to the above test. The predetermined temperature was employed as the measuring temperature.

(7) Thermal deformation temperature

Measure according to the method prescribed in JIS K7207. The fiber stress was measured at 4.6 kg/cm$^2$.

(8) Rockwell hardness

Measured according to the method prescribed in JIS K7207. The thickness of a test piece was 3.2 mm. As a steel ball, R was used. The evaluation value is expressed on R scale.

(9) Amounts of maleic anhydride and styrene added

The amount of maleic anhydride added in the modified polypropylene (A) was determined by dissolving a small amount of each sample in hot xylene, adding anhydrous acetone to cause precipitation, re-dissolving the thus purified sample in xylene, and titrating the resulting solution with a methanolic solution of NaOH with heating (110° C.–120° C.) by using phenolphthalein as an indicator.

The amount of maleic anhydride added in the modified ethylenic copolymer rubber (H) was determined by purifying a small amount of each of dissolved sample in toluene, re-dissolving the thus purified sample in toluene, and titrating the resulting solution with a solution of KOH in ethanol with heating (85° C.) by using phenolphthalein as an indicator.

The amount of styrene added in the modified polypropylene (A) was determined from the intensity of an absorption peak due to a substituted benzene ring which appeared in an infrared absorption spectrum measured for the aforesaid purified sample.

(10) Mooney viscosity

Measured according to the method prescribed in JIS K6300. The measuring temperature was 121° C.

(11) Number average molecular weight

Measured by a gel permeation chromatography (GPC) under the following conditions:
GPC: type 150C, mfd. by Waters
Column: Shodex 80MA mfd. by Showa Denko K. K.
Amount of sample: 300 μl (polymer concentration 0.2 wt %)
Flow rate: 1 ml/min
Temperature: 135° C.
Solvent: trichlorobenzene A calibration curve for calculating the number average molecular weight was prepared by a conventional method by using standard polystyrene mfd. by TOHSOH CORP. Data processing was conducted by means of a data processor CP-8 Model III mfd. by TOHSOH CORP.

(12) Ethylene content

Determined by the use of a calibration curve from the absorbances of characteristic absorptions due to methyl ($-CH_3$) and methylene ($-CH_2-$) which appeared in an infrared spectrum measured by using a pressed sheet previously prepared.

The above test pieces for determining the physical properties were prepared under the following injection molding conditions unless otherwise specified. The thermoplastic resin was dried in a hot-air dryer at 120° C. for 2 hours and then injection molded by means of a IS150E type injection molding machine mfd. by Toshiba Machine Co., Ltd. at a molding temperature of 240° C. and a mold-cooling temperature of 70° C. for 15 seconds for injection and 30 seconds for cooling.

The modified polypropylene resin compositions described below were produced under the following conditions unless otherwise specified. Predetermined amounts of components were weighed individually, uniformly premixed in Henschel mixer, and then kneaded in a twin screw continuous kneading machine (Model TEX 44 SS 30BW-2V, mfd. by JAPAN STEEL WORKS LTD.) with suction through a vent at an extrusion rate of 30 kg/hour, a resin temperature of 240° C. and a screw revolution rate of 350 revolutions/min. The screws were composed of two sets of a triple-thread rotor and a triple thread kneading disc which sets were placed in two kneading zones, e.g., a zone next to the first feed opening and a zone next to the second feed opening, respectively.

EXAMPLES 1 AND 2 AND COMPARATIVE EXAMPLES 1 AND 2

Tables 1-1 and 1-2

A modified polypropylene (A) was produced in the following manner. A starting propylene homopolymer having a melt flow rate of 1.3 g/10 min, an intrinsic viscosity in tetralin at 135° C. of 2.45 dl/g, a 20° C. cold xylene soluble of 2.9% by weight, a boiling heptane soluble of 6.7% by weight, and an isotactic pentad of boiling heptane insoluble of 0.955 was modified as follows, which homopolymer had been produced by slurry polymerization by the process disclosed in JP-A-60-28405.

With 100 parts by weight of the starting propylene homopolymer were uniformly mixed by a Henschel mixer 1.0 part by weight of maleic anhydride, 0.5 part by weight of styrene, 0.6 part by weight of the propylene homopolymer containing as free-radical initiator 8% by weight of 1,3-bis(t-butylperoxyisopropyl)benzene (Sanperox ®-TY1.3, mfd. by Sanken Kako Co., Ltd) supported thereon, and 0.1 part by weight of Irganox ® 1010 (mfd. by Ciba-Geigy Ltd.) as stabilizer. The resulting mixture was melt-kneaded by means of a TEX 44 SS-30BW-2V type twin screw extruder mfd. by JAPAN STEEL WORKS. LTD., at a temperature of 220° C. for an average residence time of 1.5 minutes to obtain a (maleic anhydridestyrene)-modified polypropylene (A) having an amount of maleic anhydride added of 0.15% by weight, an amount of styrene added of 0.07% by weight and a melt flow rate of 21 g/10 min. Said modified polypropylene (A) is hereinafter abbreviated as MS-PP-1.

A modified polypropylene having an amount of maleic anhydride added of 0.08% by weight and a melt flow rate of 36 g/10 min. was produced in exactly the same manner as described above except for omitting styrene. This modified polypropylene is hereinafter abbreviated as M-PP-1.

A polybutylene terephthalate (Toughpet PBT ® N1000, mfd. by Mitsubishi Rayon Co., Ltd.) was used as a saturated polyester resin (D). This starting polybutylene terephthalate is hereinafter abbreviated as PBT-1.

An epoxy group containing copolymer (E) was produced in the following manner. A terpolymer of ethylene, vinyl acetate and glycidyl methacrylate in the, ratio of 85:5:10 by weight having a melt flow rate of 7 g/10 min. (190° C., load 2.16 kg) was produced by high-pressure radical polymerization according to the process disclosed in JP-A-47-23490 and JP-A-48-11888. This epoxy group containing copolymer is hereinafter abbreviated as E.VA.GMA-1.

The above starting materials were blended. As shown in Table 1-1, the blending proportion of E.VA.GMA-1 was unvaried, while those of MS-PP-1 or M-PP-1 and PBT-1 were various. Each blend was kneaded under the predetermined conditions to obtain a thermoplastic resin composition. Test pieces were made of the modified polypropylene resin composition under the predetermined injection molding conditions and subjected to evaluation of the physical properties. The blending proportions are expressed in % by weight. The results of evaluation of the physical properties are shown in Table 1-2.

One example of measurement of the penetration impact strength at 23° C. for Example 3 is shown in FIG. 1. Although Izod impact strength is generally employed for impact resistance evaluation, penetration impact strength is often high even when Izod impact strength is low. Polybutylene terephthalates have a much higher penetration impact strength than do propyleneethylene.propylene block copolymer though they have a lower notched Izod impact strength at $-30°$ C. than do the latter. Low-temperature falling ball test is employed for actual service evaluation of automobile parts, and the actual service evaluation by this test gives results which are well consistent with those obtained by a laboratory evaluation of the penetration impact strength. In evaluation of the penetration impact strength, the higher the energy at yield point shown in FIG. 1 and the total energy, the higher the rating. The energy at yield point and the total energy can be calculated from the measuring chart.

The state of fracture cannot be determined from the measurement chart and is judged by observing the state of fracture of a test piece after breakage. A state of fracture in which a sharp crack is formed or the test piece is divided into several pieces is referred to as "brittle fracture". The state of fracture in which the test piece is fractured in accordance with the shape of an impact probe without formation of a sharp crack o division into several pieces is referred to as "ductile fracture". The ductile fracture is preferable to the brittle fracture.

It can be seen that in Examples 1 and 2 of the present invention, the Izod impact strength and the penetration impact strength were greatly improved as compared with Comparative Examples 1 and 2 in which a maleic anhydride-modified polypropylene not modified with styrene was blended.

EXAMPLES 3 AND 4

Tables 2-1 and 2-2

The same starting materials as used in Examples 1 and 2 were blended. As shown in Table 2-1, the blending proportion of PBT-1 was unvaried, while those of MS-PP-1 and E.VA.GMA-1 were various. Using the blends thus obtained, modified polypropylene resin compositions were produced in the same manner as in Examples 1 and 2, and their physical properties were evaluated. The results of the evaluation are shown in Table 2-2.

The higher the blending proportion of the epoxy group containing copolymer E.VA.GMA-1, the higher the Izod impact strength and the penetration impact strength. By contrast, the higher said blending proportion, the lower the thermal deformation temperature and hence the heat resistance.

EXAMPLE 5

Tables 3-1 and 3-2

The same starting materials as used in Examples 1 and 2 and a basic compound (F) benzyldimethylamine (Sumicure BD ®, mfd. by Sumitomo Chemical Co., Ltd.) as reaction accelerator were blended in the proportions shown in Table 3-1. Using the blend, a modified polypropylene resin composition was produced in the same manner as in Examples 1 and 2, and its physical properties were evaluated. The results of the evaluation are shown in Table 3-2.

Although satisfactory physical properties were attained in Example 1 of the present invention in which no basic compound (F) was blended, the Izod impact strength and the penetration impact strength are further improved in Example 5 in which the basic compound (F) was blended.

EXAMPLE 6

Tables 4-1 and 4-2

A modified polypropylene (A) was produced in the following manner.

By the same method as that used for producing MS-PP-1 in Examples 1 and 2, there was modified a starting highly crystalline propylene homopolymer (hereinafter referred to as PP-2) having an intrinsic viscosity in tetralin at 135° C. of 2.42 dl/g, a melt flow rate of 1.6 g/10 min, a 20° C. cold xylene soluble of 0.6% by weight, a boiling heptane soluble of 2.9% by weight and an isotactic pendad of boiling heptane insoluble of 0.980, which homopolymer had been produced by the slurry polymerization process disclosed in JP-A-60-228504. Thus, there was obtained a (maleic anhydride-styrene)-modified highly crystalline polypropylene having an amount of maleic anhydride added of 0.15% by weight, an amount of styrene added of 0.07% by weight, and a melt flow rate of 21 g/10 min. This modified highly crystalline polypropylene is hereinafter abbreviated as MS-PP-2.

The same starting materials as in Examples 1 and 2 were blended in the proportions shown in Table 4-1, except that MS-PP-2 was used as modified polypropylene. Using the resulting blend, a modified polypropylene resin composition was produced in the same manner as in Examples 1 and 2, and its physical properties were evaluated. The evaluation results are shown in Table 4-2.

Although satisfactory physical properties were attained in Example 1 of the present invention in which the usual modified polypropylene MS-PP-1 was used, it can be seen that the employment of the modified highly crystalline polypropylene MS-PP-2 results in an increase of the flexural modulus and a rise of the thermal deformation temperature and hence brings about desirable effects on the stiffness and the heat resistance.

EXAMPLES 7 AND 8

Tables 5-1 and 5-2

A polyethylene terephthalate (Petra ® 130, mfd. by Allied Chemical Co., Ltd.) was used as saturated polyester resin (D). This starting polyethylene terephthalate is hereinafter abbreviated as PET-1.

The same stating materials as in Example 6 were blended in the proportions shown in Table 5-1, except that PET-1 alone or a mixture of PET-1 and PBT-1 was used as saturated polyester resin. Using the resulting blends, modified polypropylene resin compositions were produced in the same manner as in Example 6 except for changing the resin temperature to 270° C. Test pieces were made of each modified polypropylene resin composition by injection molding in the same manner as in Example 6 except for changing the molding temperature to 270° C., and subjected to evaluation of the physical properties. The evaluation results are shown in Table 5-2.

Although satisfactory physical properties were attained in Example 6 of the present invention in which PBT was used alone, the employment of PET-1 alone or a mixture of PET-1 and PBT-1 resulted in a rise of the thermal deformation temperature and hence improvement of heat resistance.

EXAMPLES 9 and 10 AND COMPARATIVE EXAMPLES 3 AND 4

Tables 6-1 and 6-2

A modified propylene (A) was prepared starting from the following propylene block copolymer.

A starting highly crystalline propylene block copolymer (hereinafter referred to as PP-3) was prepared according to the slurry polymerization process disclosed in JP-A-60-228504 and used. The block copolymer had the following properties:

| | |
|---|---|
| Melt flow rate: | 3.0 g/10 min, |
| Intrinsic viscosity in tetralin at 135° C.: | 3.19 dl/g, |
| Content of polypropylene homopolymer portion, the first segment produced in the first polymerization step (hereinafter referred to as | 74% by weight, |

| | |
|---|---|
| the P portion): | |
| Content of ethylene-propylene copolymer portion, the second segment produced in the second polymerization step (hereinafter referred to as the EP portion): | 26% by weight, |
| Intrinsic viscosity of the P portion in tetralin at 135° C.: | 1.64 dl/g, |
| 20° C. Cold xylene soluble of the P portion: | 1.6% by weight, |
| Boiling heptane soluble of the P portion: | 4.6% by weight, |
| Isotactic pentad of the boiling heptane insoluble of the P portion: | 0.975, |
| Intrinsic viscosity of the EP portion in tetralin at 135° C.: | 7.58 dl/g, and |
| Weight ratio of ethylene/propylene in the EP portion: | 48/52. |

The copolymer was modified in the following manner:

With 100 parts by weight of the starting propylene block copolymer were uniformly mixed by a Henschel mixer 1.0 part by weight of maleic anhydride, 0.5 part by weight of styrene, 0.6 part by weight of the propylene homopolymer containing as free-radical initiator 8% by weight of 1,3-bis(t-butylperoxyisopropyl)benzene (Sanperox ®-TY1.3, mfd. by Sanken Kako Co., Ltd) supported thereon, and 0.1 part by weight of Irganox ® 1010 (mfd. by Ciba-Geigy Ltd.) as stabilizer. The resulting mixture was melt-kneaded by means of a TEX 44 SS-30BW-2V type twin screw extruder mfd. by JAPAN STEEL WORKS. LTD., at a temperature Of 220° C. for an average residence time of 1.5 minutes to obtain a (maleic anhydride-styrene)-modified highly crystalline polypropylene (A) having an amount of maleic anhydride added of 0.33% by weight, an amount of styrene added of 0.14% by weight and a melt flow rate of 10 g/10 min. Said modified highly crystalline polypropylene (A) is hereinafter abbreviated as MS-PP-3.

A modified polypropylene having an amount of maleic anhydride added of 0.20% by weight and a melt flow rate of 39 g/10 min. was produced in exactly the same manner as described above except for omitting styrene. This modified polypropylene is hereinafter abbreviated as M-PP-3.

A modified polypropylene (A) was prepared starting from the following propylene block copolymer.

A starting highly crystalline propylene block copolymer (hereinafter referred to as PP-4) was prepared according to the gas phase polymerization process disclosed in JP-A-62-187917 and used. The block copolymer had the following properties:

| | |
|---|---|
| Melt flow rate: | 1.3 g/10 min, |
| Intrinsic viscosity in tetralin at 135° C.: | 2.59 dl/g, |
| Content of polypropylene homopolymer portion, the first segment produced in the first polymerization step (hereinafter referred to as the P portion): | 69% by weight, |
| Content of ethylene-propylene copolymer portion, the second segment produced in the second polymerization step (hereinafter referred to as the EP portion): | 31% by weight, |
| Intrinsic viscosity of the P portion in tetralin at 135° C.: | 2.16 dl/g, |
| 20° C. Cold xylene soluble of the P portion: | 1.0% by weight, |
| Boiling heptane soluble of the P portion: | 4.4% by weight, |
| Isotactic pentad of the boiling heptane insoluble of the P portion: | 0.975, |
| Intrinsic viscosity of the EP portion in tetralin at 135° C.: | 3.55 dl/g, and |
| Weight ratio of ethylene/propylene in the EP portion: | 27/73. |

The copolymer was modified in the same manner as in the preparation of MS-PP-3 described above to obtain a (maleic anhydride-styrene)-modified highly crystalline polypropylene (A) having an amount of maleic anhydride added of 0.37% by weight, an amount of styrene added of 0.16% by weight and a melt flow rate of 29 g/10 min. Said modified highly crystalline polypropylene (A) is hereinafter abbreviated as MS-PP-4.

A modified polypropylene having an amount of maleic anhydride added of 0.22% by weight and a melt flow rate of 35 g/10 min. was produced in exactly the same manner as described above except for omitting styrene. This modified polypropylene is hereinafter abbreviated as M-PP-4.

Then modified polypropylene resin compositions were prepared according to Examples 1 and 2 with compounding the same constituents as in Examples 1 and 2 except the above mentioned starting materials in a proportion shown in Table 6-1. The physical properties of the obtained modified polypropylene resin compositions were evaluated accordingly. Table 6-2 shows the results.

It can be seen that in Examples 9 and 10 of the present invention, the Izod impact strength and the penetration impact strength were greatly improved, the flexural modulus of elasticity and thermal deformation temperature were increased and satisfactory stiffness and heat resistance were performed as compared with Comparative Examples 3 and 4 in which a maleic anhydride-modified polypropylene not modified with styrene was blended.

EXAMPLES 11 AND 14

Tables 7-1 and 7-2

An epoxy group containing copolymer (E) was prepared in the following manner.

High pressure radical polymerization of the starting monomers as used in Examples 1 and 2 except that vinyl acetate wa replaced with methyl acrylate gave a terpolymer of high glycidyl methacrylate content having a melt flow rate of 21 g/10 min (at 190° C. under a load of 2.16 kg) and a weight content ratio between ethylene, methyl acrylate and glycidyl methacrylate of 64:14:22. Thus obtained epoxy group containing copolymer is hereinafter referred to as E.MA.GMA-1.

Modified polypropylene resin compositions were produced with compounding E.VA.GMA-1 or E.-MA.GMA-1 as the epoxy group containing copolymer, MS-PP-2 and MA-PP-4 as the modified polypropylene and PBT-1 as the saturated polyester resin in a proportion shown in Table 7-1 in the same manner as in Examples 1 and 2. The physical properties thereof were evaluated in the same manner as in Examples 1 and 2. Table 7-2 shows the results.

Compounding E.MA.GMA-1 or E.VA.GMA-1 gave products of good quality as well. It is also demonstrated that products of good quality were obtained when the proportion of E.MA.GMA-1 was varied.

EXAMPLES 15 TO 17

Tables 8-1 and 8-2

Glass short fiber of chopped strand Microglass ® RES03X-TP10532 mfd. by Nihon Glass Fiber Co., Ltd. was used as filler (I). Said glass short fiber is hereinafter abbreviated as GF-1.

The same components as used in Example 11 and GF-1 were used. The components other than GF-1 had been blended in the proportions shown in Table 8-1, had been fed through the first feed opening, and previously melt-kneaded. The constituent GF-1 was fed through the second feed opening, and a modified polypropylene resin composition was produced under the predetermined kneading conditions. The evaluation of the physical properties thereof were carried out in the same manner as in Examples 1 and 2. The results are shown in Table 8-2.

In Examples 15 to 17 of the present invention in which GF-1 was used as filler, the Izod impact strength and the penetration impact strength were a little lower but the flexural modulus and the thermal deformation temperature were much higher, as compared with Example 11 in which GF-1 was not blended.

EXAMPLES 18 TO 20 AND COMPARATIVE EXAMPLE 5

Tables 9-1 and 9-2

The same materials as in Example 11 were blended, except that a starting highly crystalline propylene homopolymer for MS-PP-2 (hereinafter abbreviated as PP-2) and a starting highly crystalline propylene block copolymer for MS-PP-4 (hereinafter referred to as PP-4) were used as polypylene (B). As shown in Table 9-1, the blending proportions of PBT-1 and E.VA.G-MA-1 were unvaried, while those of MS-PP-3, PP-1, MS-PP-4 and PP-4 were various. Using the blends thus obtained, modified polypropylene resin compositions were produced in the same manner as in Examples 1 and 2, and their physical properties were evaluated.

The results of the evaluation are shown in Table 9-2. It can be seen that in Examples 18 to 20 of the present invention, the Izod impact strength and the penetration impact strength were greatly improved as compared with Comparative Example 5 in which the modified polypropylene (A), MS-PP-2 and MS-PP-4 were not used.

EXAMPLES 21 TO 25

Tables 10-1 and 10-2

As the ethylenic copolymer rubber (G) were used pellets of ethylene-propylene copolymer rubber having a number average molecular weight of 60,000 and an ethylene content Of 78% by weight. This ethylenepropylene copolymer rubber is hereinafter abbreviated as EPM-1.

The same starting materials as in Examples 1 and 2 were blended in the proportions shown in Table 10-1, except that EPM-1 was used.

The same starting material as used in Examples 1 and 2 and EPM-1 were blended. As shown in Table 10-1, the blending proportions of EPM-1 and E.VA.GMA-1 were unvaried, while those of MS-PP-1 and PBT-1 were various. Using the blends thus obtained, modified polypropylene resin compositions were produced in the same manner as in Examples 1 and 2, and their physical properties were evaluated. The results are shown in Table 10-2. It can be seen that in Examples 21 to 25 of the present invention, the Izod impact strength and the penetration impact strength were markedly improved as compared with Comparative Examples 1 and 2 in which the ethylenepropylene copolymer rubber and not blended.

EXAMPLE 26 TO 29

Tables 11-1 and 11-2

The same starting materials as used in Examples 21 to 25 were blended. As shown in Table 11-1, the blending proportions of PBT-1 and E.VA.GMA-1 were unvaried, while those of MS-PP-1 and EPM-1 were various. Using the blends thus obtained, modified polypropylene resin compositions were produced in the same manner as in Examples 1 and 2, and their physical properties were evaluated. Table 11-2 shows the results.

The higher the blending proportion of the ethylenepropylene copolymer rubber EPM-1, the higher the Izod impact strength and the penetration impact strength. By contrast, the thermal deformation temperature, i.e. heat resistance, was reduced.

EXAMPLES 30 TO 32 AND COMPARATIVE EXAMPLE 6

Tables 12-1 and 12-2

The same starting materials as used in Examples 21 to 25 were blended. As shown in Table 12-1, the blending proportions of MS-PP-1 and PBT-1 were unvaried, while those of and EPM-1 and E.VA.GMA-1 were various. Using the blends thus obtained, modified polypropylene resin compositions were produced in the same manner as in Examples 1 and 2, and their physical properties were evaluated. Table 11-2 shows the results.

It can be seen that in Examples 30 to 32, the Izod Impact strength and penetration impact strength were remarkably improved as compared with Comparative Example 6 in which the epoxy group containing copolymer E.VA.GMA-1 was not contained.

EXAMPLE 33

Tables 13-1 and 13-2

The same starting materials as used in Examples 21 and 25 and a basic compound (F) benzyldimethylamine (Sumicure BD ®, mfd. by Sumitomo Chemical Co., Ltd.) as the reaction accelerator were blended in the proportions shown in Table 13-1. Using the blends thus obtained, modified polypropylene resin compositions were produced in the same manner as in Examples 1 and 2, and their physical properties were evaluated. Table 11-2 shows the results.

Although satisfactory physical properties were attained in Example 23 of the present invention in which no basic compound (F) was blended, the Izod impact strength and the penetration impact strength were further improved in Example 33 in which the basic compound (F) was blended.

EXAMPLE 34

Tables 14-1 and 14-2

The same starting materials as used in Examples 21 to 25 except that MS-PP-2 was used as the modified polypolypropylene were blended in the proportions shown in Table 14-1. Using the blends thus obtained, modified propylene resin compositions were produced in the same manner as in Examples 1 and 2, and their physical properties were evaluated. Table 14-2 shows the results.

Although satisfactory physical properties were attained in Example 23 of the present invention in which the usual modified polypropylene MS-PP-1 was blended, it can be seen that the employment of the modified highly crystalline polypropylene MS-PP-2 results in an increase of the flexural modulus of elasticity and a rise of the thermal deformation temperature and hence brings about desirable effects on the stiffness and the heat resistance.

EXAMPLE 35

Tables 15-1 and 15-2

A ground product of ethylene-propylene copolymer rubber having a number average molecular weight of 55,000 and an ethylene content of 47% by weight was used. The ethylene-propylene copolymer rubber is hereinafter referred to as EPM-2.

The same starting materials as used in Example 34 except that EPM-2 was used as the ethylene-propylene copolymer rubber were blended in the proportions shown in Table 15-1. Using the blends thus obtained, modified polypropylene resin compositions were produced in the same manner as in Examples 1 and 2, and their physical properties were evaluated. Table 15-2 shows the results.

Although satisfactory physical properties were attained in Example 34 of the present invention in which EPM-1 was used as the ethylene-propylene copolymer rubber, it can be seen that the employment of EPM-2 satisfactorily improves the Izod impact strength and penetration impact strength at the lower temperature.

EXAMPLES 36 AND 37

Tables 16-1 and 16-2

The same starting materials as in Example 35 except that PET-1 alone or a mixture of PET-1 and PBT-1 was used as the saturated polyester resin were blended in the proportions shown in Table 16-1. Using the resulting blends, modified polypropylene resin compositions were produced in the same manner as in Example 35 except for changing the resin temperature to 270° C. Test pieces were made of each modified polypropylene resin composition by injection molding in the same manner as in Example 35 except for changing the molding temperature to 270° C., and subjected to evaluation of the physical properties. The evaluation results are shown in Table 16-2.

Although satisfactory physical properties were attained in Example 35 of the present invention in which PBT was used alone, the employment of PET-1 alone or a mixture of PET-1 and PBT-1 resulted in a rise of the thermal deformation temperature and hence improvement of heat resistance.

EXAMPLES 38 AND 39

Tables 17-1 and 17-2

The same starting materials as used in Example 35 except that E.MA.GMA-1 was used as the epoxy group containing copolymer were blended in the proportions shown in Table 17-1. Using the blends thus obtained, modified polypropylene resin compositions were produced in the same manner as in Examples 1 and 2, and their physical properties were evaluated. Table 17-2 shows the results, which were as excellent as in Example 35.

EXAMPLES 40 TO 42

Tables 18-1 and 18-2

The same components as used in Examples 38 and 39 and GF-1 were used. The components other than GF-1 had been blended in the proportions shown in Table 18-1, fed through the first feed opening, and previously melt-kneaded. The constituent GF-1 was fed through the second feed opening and a modified polypropylene resin composition was produced. The physical properties were evaluated in the same manner as in Examples 1 and 2. Table 18-2 shows the results.

In Examples in which GF-1 was used as filler, the Izod impact strength and the penetration impact strength were a little lower but the flexural modulus and the thermal deformation temperature were much higher, as compared with Example 38 in which GF-1 was not blended.

EXAMPLES 43 TO 45

Tables 19-1 and 19-2

The same starting materials as used in Examples 21 to 25 except that the starting propylene homopolymer for MS-PP-1 (hereinafter referred to as PP-1) were blended. As shown in Table 19-1, the blending proportions of PBT-1, E.VA.GMA-1 and EPM-1 were unvaried, while those of MS-PP-1 and PP-1 were various. Using the blends thus obtained, modified polypropylene resin compositions were produced in the same manner as in Examples 1 and 2, and their physical properties were evaluated. Table 19-2 shows the results.

It can be seen that in Examples 43 to 45, the Izod Impact strength and penetration impact strength were remarkably improved as compared with Comparative Example 1 in which EPM-1 was not contained.

EXAMPLES 46 TO 50

Tables 20-1 and 20-2

A modified ethylenic copolymer rubber (H) was prepared in the following manner.

With 100 parts by weight of pellets of ethylene-propylene copolymer rubber having a number average molecular weight of 60,000 and an ethylene content of 78% by weight were mixed in a Henschel mixer 2.0 parts by weight of maleic anhydride and 1.0 part by weight of the propylene homopolymer containing as free-radical initiator 8% by weight of 1,3-bis(t-butylperoxyisopropyl)benzene (Sanperox ®-TY1.3, mfd. by Sanken Kako Co., Ltd.) supported thereon. Subsequently, the resulting mixture was melt-kneaded under nitrogen by means of a TEX 44 SS-30BW-2V type twin screw extruder mfd. by JAPAN STEEL WORKS, LTD., under a nitrogen atmosphere at a kneading temperature of 250° C. and an extrusion rate of 18 kg/hour to obtain a modified ethylenepropylene copolymer rubber having an amount of maleic anhydride added of 0.7% by weight and a Mooney viscosity ($ML_{1+4}$, 121° C.) of 72. Said modified ethylene-propylene copolymer rubber is hereinafter abbreviated as M-EPM-1.

The same starting materials as in Examples 1 and 2 except for M-EPM-1 were used. As shown in Table 20-1, the blending proportions of MS-EPM-1 and E.-VA.GMA-1 were unvaried, while those of MS-PP-1 and PST-1 were various. Each blend was kneaded under the predetermined conditions to obtain a modified polypropylene resin composition. The physical properties thereof were evaluated in the same manner as in Examples 1 and 2. The results of evaluation of the physical properties are shown in Table 20-2.

It can be seen that in Examples 46 and 50 of the present invention, the Izod impact strength and the penetration impact strength were greatly improved as compared with Comparative Examples 1 and 2 in which a modified ethylene-propylene copolymer rubber was not blended.

EXAMPLES 51 TO 54

Tables 21-1 and 21-2

EXAMPLES 55-57 AND COMPARATIVE EXAMPLE 7

Tables 22-1 and 22-2

The same starting materials as used in Examples 46 to 50 were blended. As shown in Table 22-1, the blending proportions of MS-PP-1 and PBT-1 were unvaried, while those of M-EMP-1 and E.VA.GMA-1 were various. Using the blends thus obtained, modified polypropylene resin compositions were produced in the same manner as in Examples 1 and 2, and their physical properties were evaluated. Table 22-2 shows the results. It can been seen that Examples 55 to 57 of the present invention exhibit a far higher Izod impact strength and penetration impact strength than Comparative Example 7 in which the epoxy group containing copolymer E.-VA.GMA was not blended.

The same starting materials as used in Examples 46 to 50 were blended. As shown in Table 22-1, the blending proportions of PBT-1 and E.VA.GMA-1 were unvaried, while those of MS-PP-1 and M-EPM-1 were various. Using the blends thus obtained, modified polypropylene resin compositions were produced in the same manner as in Examples 1 and 2, and their physical properties were evaluated. Table 22-2 shows the results.

The higher the blending proportion of the modified ethylene-propylene copolymer rubber M-EPM-1, the higher the Izod impact strength and the penetration impact strength. By contrast, the thermal deformation temperature, i.e. heat resistance, was reduced.

EXAMPLE 58

Tables 23-1 and 23-2

The same starting materials as used in Examples 46 to 50 and a basic compound (F) benzyldimethylamine (Sumicure BD®, mfd. by Sumitomo Chemical Co., Ltd.) as the reaction accelerator were blended in the proportions shown in Table 23-1. Using the blends thus obtained, a modified polypropylene resin composition was produced in the same manner as in Examples 1 and 2, and its physical properties were evaluated. Table 23-2 shows the results.

Although satisfactory physical properties were attained in Example 48 of the present invention in which no basic compound (F) was blended, the Izod impact strength and the penetration impact strength were further improved in Example 58 in which the basic compound (F) was blended.

EXAMPLE 59

Tables 24-1 and 24-2

The same starting materials as used in Examples 46 to 50 except that MS-PP-2 was used as the modified polypropylene were blended in the proportions shown in Table 24-1. Using the blends thus obtained, a modified polypropylene resin compositions was produced in the same manner as in Examples 1 and 2, and their physical properties were evaluated. Table 24-2 shows the results.

Although satisfactory physical properties were attained in Example 48 of the present invention in which the usual modified polypropylene MS-PP-1 was blended, it can be seen that the employment of the modified highly crystalline polypropylene MS-PP-2 results in an increase of the flexural modulus of elasticity and a rise of the thermal deformation temperature and hence brings about desirable effects on the stiffness and the heat resistance.

EXAMPLE 60

Tables 25-1 and 25-2

A modified ethylenic copolymer rubber (H) was prepared in the following manner.

A ground product of ethylene-propylene copolymer rubber having a number average molecular weight of 55,000 and an ethylene content of 47% by weight was prepared in the same manner as in the modification of M-EPM-1 in Examples 46 to 50, a modified ethylene-propylene copolymer rubber having an amount of maleic anhydride added of 0.5% by weight and a Mooney viscosity at 121° C. ($ML_{1+4}$ 121° C.) of 65 was prepared. The ethylene-propylene copolymer rubber is hereinafter referred to as M-EPM-2.

The same starting materials as used in Example 59 except that M-EPM-2 was used as the modified ethylene-propylene copolymer rubber were blended in the proportions shown in Table 25-1. Using the blends thus obtained, modified polypropylene resin compositions were produced in the same manner as in Examples 1 and 2, and their physical properties were evaluated. Table 25-2 shows the results.

Although satisfactory physical properties were attained in Example 59 of the present invention in which M-EPM-1 was used as the ethylene-propylene copolymer rubber, it can be seen that the employment of M-EPM-2 penetration impact strength at the lower temperature.

EXAMPLES 61 AND 62

Tables 26-1 and 26-2

The same starting materials as in Example 60 except that PET-1 alone or a mixture of PET-1 and PBT-1 was used as the saturated polyester resin were blended in the proportions shown in Table 26-1. Using the resulting blends, modified polypropylene resin compositions were produced in the same manner as in Example 60 except for changing the resin temperature to 270° C. Test pieces were made of each modified polypropylene rein composition by injection molding in the same manner as in Example 60 except for changing the molding temperature to 270° C., and subjected to evaluation of the physical properties. The evaluation results are shown in Table 26-2.

Although satisfactory physical properties were attained in Example 60 of the present invention in which PBT was used alone, the employed of PET-1 alone or a mixture of PET-1 and PBT-1 resulted in a rise of the thermal deformation temperature and hence improvement of heat resistance.

EXAMPLE 63 AND 64

Tables 27-1 and 27-2 the same starting materials as used in Example 60 except that E.MA.GMA-1 was used as the epoxy group containing copolymer were blended in the proportions shown in Table 27-1. Using the blends thus obtained, modified polypropylene resin compositions were produced in the same manner as in Examples 1 and 2, and their physical proprieties were evaluated. Table 27-2 shows the results, which were as excellent as in Example 60.

EXAMPLES 65 TO 67

Tables 28-1 and 28-2

The same components as used in Examples 63 and 64 and GF-1 were used. The components other than GF-1 had been blended in the proportions shown in Table 28-1, had been fed through the first feed opening, and previously kneaded. The constituent GF-1 was fed through the second feed opening, and a modified polypropylene resin composition was produced. The physical properties were evaluated in the same manner as in Examples 1 and 2. Table 28-2 shows the results.

In Examples in which GF-1 was used as filler, the Izod impact strength and the penetration impact strength were a little lower but the flexural modulus and the thermal deformation temperature were much higher, as compared with Example 63 in which GF-1 was not blended.

EXAMPLES 68 TO 70

Tables 29-1 and 29-2

The same starting materials as used in Examples 46 to 50 except that PP-1 was used as polypropylene (B) were blended. As shown in Table 29-1, the blending proportions of PBT-1, E.VA.GMA-1 and M-EPM-1 were unvaried, while those of MS-PP-1 and PP-1 were various. Using the blends thus obtained, modified polypropylene resin compositions were produced in the same manner as in Examples 1 and 2, and their physical properties were evaluated. Table 29-2 shows the results.

It can be seen that in Examples 68 to 70, the Izod impact strength and penetration impact strength were remarkably improved as compared with Comparative Example 1 in which M-EPM-1 was not contained.

EXAMPLES 71

Tables 30-1 and 30-2

The same starting materials as used in Example 59 were used in the blending proportions as shown in Table 30-1. Using the blend thus obtained, modified polypropylene resin composition was produced in the same manner as in Examples 1 and 2, and its physical properties were evaluated. Table 30-2 shows the results.

It can be seen that in Example 71 of the present invention, the Izod impact strength and the penetration impact strength were remarkably improved as compared with Comparative Examples 1 and 2 in which no modified ethylene-propylene copolymer rubber. Also the modified polypropylene resin composition of Example 71 showing a higher thermal deformation temperature and Rockwell hardness than those of Examples 50 and 59 has an advantage in heat resistance and scratch resistance.

EXAMPLE 72

Table 31-1, and 31-2

As the polypropylene (B), a starting highly crystalline propylene block copolymer (hereinafter referred to as PP-5) was prepared according to the slurry polymerization process disclosed in JP-A-60-28504 and used. The block copolymer had the following properties:

| | |
|---|---|
| Melt flow rate: | 7.5 g/10 min, |
| Intrinsic viscosity in tetralin at 135° C.: | 2.18 dl/g, |
| Content of polypropylene homopolymer portion, the first segment produced in the first polymerization step (hereinafter referred to as the P portion): | 84% by weight, |
| Content of ethylene-propylene copolymer portion, the second segment produced in the second polymerization step (hereinafter referred to as the EP portion): | 16% by weight, |
| Intrinsic viscosity of the P portion in tetralin at 135° C.: | 1.60 dl/g, |
| 20° C. Cold xylene soluble of the P portion: | 1.6% by weight, |
| Boiling heptane soluble of the P portion: | 4.6% by weight, |
| Isotactic pentad of the boiling heptane insoluble of the P portion: | 0.975, |
| Intrinsic viscosity of the EP portion in tetralin at 135° C.: | 5.2 dl/g, and |
| Weight ratio of ethylene/propylene in the EP portion: | 37/63. |

The same starting materials as used in Examples 63 and 64 except that PP-5 was used as the polypropylene (B) were blended in the proportions shown in Table 31-1. Using the blends thus obtained, a modified polypropylene resin composition was produced in the same manner as in Examples 1 and 2.

Table 31-2 shows the results. The results demonstrate that using a propylene block copolymer as the polypropylene (B) remarkably improves the fluidity of the modified polypropylene resin composition without damaging the physical properties. Thus, the results were fully satisfactory.

EXAMPLES 73 AND 74

Tables 32-1 and 32-2

A modified ethylenic copolymer rubber (H) was produced in the following manner. With 100 parts by weight of pellets of ethylene-butene-1 copolymer rubber having a number average molecular weight of 50,000 and an ethylene content of 82% by weight were mixed in a Hensche mixer 2.0 parts by weight of maleic anhydride and 1.0 part by weight of the propylene homopolymer containing as free-radical initiator 8% by weight of 1,3-bis(t-butylperoxyisopropyl)benzene (Sanperox ®-TY1.3, mfd. by Sanken Kako Co., Ltd.) supported thereon. Subsequently, the resulting mixture was melt-kneaded under nitrogen by means of a TEX 44 SS-30BW-2V type twin screw extruder mfd. by JAPAN STEEL WORKS, LTD., under a nitrogen atmosphere at a kneading temperature of 250° C. and an extrusion rate of 18 kg/hour to obtain a modified ethylene-butene-1 copolymer rubber having an amount of maleic anhydride added of 0.6% by weight and Mooney viscosity ($ML_{1+4}$, 121° C.) of 91. Said modified ethylenebutene-1 copolymer rubber is hereinafter abbreviated as M-EBM-1.

The same procedure as in Examples 1 and 2 were repeated with the same starting materials used in Examples 63 and 64 except that M-EPM-1 or M-EBM-1 was used as the modified ethylenic copolymer rubber instead of M-EPM-2, in the proportions shown in Table 32-1 to obtain modified polypropylene resin compositions. The physical properties thereof were evaluated in the same manner as above. Table 32-2 shows the results. Both of the modified polypropylene resin compositions of Examples 73 and 74 exhibit good properties. Also the modified polypropylene resin composition of Example 74, in which a modified ethylene-butene-1 copolymer was used as the modified ethylenic copolymer rubber, is advantageous in scratch resistance since it shows a higher Rockwell hardness than that of Example 73 with a modified ethylene-propylene copolymer rubber.

TABLE 1-1

| Constituent Thermoplastic resin comp. No. | Modified polypropylene (A) MS-PP-1 | Saturated polyester resin (D) PBT-1 | Epoxy group containing copolymer (E) E.VA.GMA-1 | Modified polypropylene M-PP-1 |
|---|---|---|---|---|
| Example 1 | 70 | 20 | 10 | — |
| Example 2 | 60 | 30 | 10 | — |
| Comparative Example 1 | — | 20 | 10 | 70 |
| Comparative Example 2 | — | 30 | 10 | 60 |

TABLE 1-2

| Physical properties Thermoplastic resin comp. No. | Specific gravity | Melt flow rate (g/10 min) | Tensile properties | | Flexural properties | |
|---|---|---|---|---|---|---|
| | | | Strength at yield (kg/cm$^2$) | Elongation at break (%) | Modulus of elasticity (kg/cm$^2$) | Strength (kg/cm$^2$) |
| Example 1 | 0.985 | 8.3 | 285 | >200 | 15,200 | 410 |
| Example 2 | 1.010 | 5.5 | 316 | >200 | 16,200 | 459 |
| Comparative Example 1 | 0.985 | 15.0 | 272 | >200 | 15,000 | 404 |
| Comparative Example 2 | 1.010 | 10.0 | 302 | >200 | 16,000 | 452 |

| Physical properties Thermoplastic resin comp. No. | Izod impact strength | | Penetration impact strength (YE/TE)[*1] | | Thermal deformation temp. (°C.) | Rockwell hardness H$_R$ |
|---|---|---|---|---|---|---|
| | 23° C. (kg·cm/cm) | −30° C. | 23° C. (J: joule) | −30° C. | | |
| Example 1 | 7.2 | 3.2 | 25/38 (B) | 0.2/0.2 (B) | 124 | 98 |
| Example 2 | 8.3 | 3.4 | 19/29 (B) | 0.2/0.2 (B) | 134 | 99 |
| Comparative Example 1 | 5.1 | 3.1 | 17/26 (B) | 0.1/0.1 (B) | 122 | 95 |
| Comparative Example 2 | 5.9 | 3.3 | 15/21 (B) | 0.1/0.1 (B) | 132 | 96 |

Note:
[*1] Penetration impact strength, YE denotes yield point energy, TE denotes total energy, (D) and (B) indicate the states of fracture: (D): ductile fracture, (B): brittle fracture.

TABLE 2-1

| Constituent Thermoplastic resin comp. No. | Modified polypropylene (A) MS-PP-1 | Saturated polyester resin (D) PBT-1 | Epoxy group containing copolymer (E) E.VA.GMA-1 |
|---|---|---|---|
| Example 3 | 60 | 20 | 20 |
| Example 4 | 49 | 20 | 31 |

TABLE 2-2

| Physical properties Thermoplastic resin comp. No. | Specific gravity | Melt flow rate (g/10 min) | Tensile properties | | Flexural properties | |
|---|---|---|---|---|---|---|
| | | | Strength at yield (kg/cm$^2$) | Elongation at break (%) | Modulus of elasticity (kg/cm$^2$) | Strength (kg/cm$^2$) |
| Example 3 | 0.978 | 6.6 | 246 | >200 | 11,000 | 330 |
| Example 4 | 0.982 | 1.6 | 228 | >200 | 9,500 | 269 |

| Physical properties Thermoplastic resin comp. No. | Izod impact strength | | Penetration impact strength (YE/TE)[*1] | | Thermal deformation temp. (°C.) | Rockwell hardness H$_R$ |
|---|---|---|---|---|---|---|
| | 23° C. (kg·cm/cm) | −30° C. | 23° C. (J: joule) | −30° C. | | |
| Example 3 | 13.1 | 4.1 | 29/47 (D) | 0.2/0.2 (B) | 115 | 87 |
| Example 4 | 15.0 | 5.0 | 28/49 (D) | 0.4/0.4 (B) | 95 | 73 |

Note:
[*1] penetration impact strength, YE denotes yield point energy, TE denotes total energy, (D) and (B) indicate the states of fracture: (D): ductile fracture, (B): brittle fracture.

TABLE 3-1

| Constituent Thermoplastic resin comp. No. | Modified polypropylene (A) MS-PP-1 | Saturated polyester resin (D) PBT-1 | Epoxy group containing copolymer (E) E.VA.GMA-1 | Basic compound (F) Sumicure ® BD |
|---|---|---|---|---|
| Example 5 | 70 | 20 | 10 | 0.5 |

TABLE 3-2

| Physical properties Thermoplastic resin comp. No. | Specific gravity | Melt flow rate (g/10 min) | Tensile properties | | Flexural properties | |
|---|---|---|---|---|---|---|
| | | | Strength at yield (kg/cm$^2$) | Elongation at break (%) | Modulus of elasticity (kg/cm$^2$) | Strength (kg/cm$^2$) |
| Example 5 | 0.985 | 2.4 | 304 | >200 | 15,300 | 424 |

| Physical properties Thermoplastic resin comp. No. | Izod impact strength | | Penetration impact strength (YE/TE)*[1] | | Thermal deformation temp. (°C.) | Rockwell hardness H$_R$ |
|---|---|---|---|---|---|---|
| | 23° C. (kg · cm/cm) | −30° C. | 23° C. (J: joule) | −30° C. | | |
| Example 5 | 9.7 | 4.0 | 28/40 (D~B) | 0.3/0.3 (B) | 130 | 102 |

Note:
*[1]Penetration impact strength. YE denotes yield point energy, TE denotes total energy. (D) and (B) indicate the states of fracture: (D): ductile fracture, (B): brittle fracture.

TABLE 4-1

| Constituent Thermoplastic resin comp. No. | Modified polypropylene (A) MS-PP-2 | Saturated polyester resin (D) PBT-1 | Epoxy group containing copolymer (E) E.VA.GMA-1 |
|---|---|---|---|
| Example 6 | 70 | 20 | 10 |

TABLE 4-2

| Physical properties Thermoplastic resin comp. No. | Specific gravity | Melt flow rate (g/10 min) | Tensile properties | | Flexural properties | |
|---|---|---|---|---|---|---|
| | | | Strength at yield (kg/cm$^2$) | Elongation at break (%) | Modulus of elasticity (kg/cm$^2$) | Strength (kg/cm$^2$) |
| Example 6 | 0.985 | 8.3 | 314 | >200 | 15,800 | 458 |

| Physical properties Thermoplastic resin comp. No. | Izod impact strength | | Penetration impact strength (YE/TE)*[1] | | Thermal deformation temp. (°C.) | Rockwell hardness H$_R$ |
|---|---|---|---|---|---|---|
| | 23° C. (kg · cm/cm) | −30° C. | 23° C. (J: joule) | −30° C. | | |
| Example 6 | 7.2 | 3.2 | 22/36 (B) | 0.2/0.2 (B) | 133 | 103 |

Note:
*[1]Penetration impact strength. YE denotes yield point energy, TE denotes total energy. (D) and (B) indicate the states of fracture: (D): ductile fracture, (B): brittle fracture.

TABLE 5-1

| Constituent Thermoplastic resin comp. No. | Modified polypropylene (A) MS-PP-2 | Saturated polyester resin (D) PBT-1 | Saturated polyester resin (D) PET-1 | Epoxy group containing copolymer (E) E.VA.GMA-1 |
|---|---|---|---|---|
| Example 7 | 70 | 10 | 10 | 10 |
| Example 8 | 70 | — | 20 | 10 |

TABLE 5-2

| Physical properties Thermoplastic resin comp. No. | Specific gravity | Melt flow rate (g/10 min) | Tensile properties | | Flexural properties | |
|---|---|---|---|---|---|---|
| | | | Strength at yield (kg/cm$^2$) | Elongation at break (%) | Modulus of elasticity (kg/cm$^2$) | Strength (kg/cm$^2$) |
| Example 7 | 0.990 | 7.8 | 342 | 178 | 19,230 | 522 |
| Exmaple 8 | 0.995 | 7.3 | 368 | 155 | 22,670 | 586 |

| Physical properties Thermoplastic | Izod impact strength | Penetration impact strength (YE/TE)*[1] | Thermal deforma- | Rockwell |

TABLE 5-2-continued

| resin comp. No. | 23° C. (kg · cm/cm) | −30° C. | 23° C. (J: joule) | −30° C. | tion temp. (°C.) | hardness $H_R$ |
|---|---|---|---|---|---|---|
| Example 7 | 5.4 | 3.2 | 26/31 (B) | 0.2/0.2 (B) | 141 | 105 |
| Example 8 | 4.6 | 3.2 | 17/26 (B) | 0.2/0.2 (B) | 154 | 108 |

Note
*[1] Penetration impact strength. YE denotes yield point energy, TE denotes total energy. (D) and (B) indicate the states of fracture: (D): ductile fracture, (B): brittle fracture.

TABLE 6-1

| Constituent Thermoplastic resin comp. No. | Modified polypropylene (A) MS-PP-3 | Modified polypropylene (A) MS-PP-4 | Saturated polyester resin (D) PBT-1 | Epoxy group containing copolymer (E) E.VA.GMA-1 | Modified polypropylene M-PP-3 | Modified polypropylene M-PP-4 |
|---|---|---|---|---|---|---|
| Example 9 | 70 | — | 20 | 10 | — | — |
| Example 10 | — | 70 | 30 | 10 | — | — |
| Comparative Example 3 | — | — | 20 | 10 | 70 | — |
| Comparative Example 4 | — | — | 20 | 10 | — | 70 |

TABLE 6-2

| Physical properties Thermoplastic resin comp. No. | Specific gravity | Melt flow rate (g/10 min) | Tensile properties Strength at yield (kg/cm²) | Tensile properties Elongation at break (%) | Flexural properties Modulus of elasticity (kg/cm²) | Flexural properties Strength (kg/cm²) |
|---|---|---|---|---|---|---|
| Example 9 | 0.971 | 7.9 | 190 | 51 | 9,900 | 284 |
| Example 10 | 0.966 | 8.4 | 165 | >200 | 7,460 | 215 |
| Comparative Example 3 | 0.971 | 14.3 | 181 | 41 | 9,770 | 280 |
| Comparative Example 4 | 0.966 | 15.2 | 157 | 180 | 7,360 | 212 |

| Physical properties Thermoplastic resin comp. No. | Izod impact strength 23° C. (kg · cm/cm) | Izod impact strength −30° C. | Penetration impact strength (YE/TE)*[1] 23° C. (J: joule) | Penetration impact strength (YE/TE)*[1] −30° C. | Thermal deformation temp. (°C.) | Rockwell hardness $H_R$ |
|---|---|---|---|---|---|---|
| Example 9 | 13.0 | 5.3 | 28/48 (D) | 2.8/2.9 (B) | 115 | 74 |
| Example 10 | 74.2 | 9.9 | 29/49 (D) | 5.0/6.0 (B) | 105 | 53 |
| Comparative Example 3 | 9.2 | 5.1 | 22/35 (B) | 1.3/1.5 (B) | 113 | 72 |
| Comparative Example 4 | 52.6 | 9.6 | 21/36 (B) | 2.5/2.7 (B) | 103 | 51 |

Note
*[1] Penetration impact strength. YE denotes yield point energy, TE denotes total energy. (D) and (B) indicate the states of fracture: (D): ductile fracture, (B): brittle fracture.

TABLE 7-1

| Constituent Thermoplastic resin comp. No. | Modified polypropylene (A) MS-PP-2 | Modified polypropylene (A) MS-PP-4 | Saturated polyester resin (D) PBT-1 | Epoxy group containing copolymer (E) E.VA.GMA-1 | Epoxy group containing copolymer (E) E.MA.GMA-1 |
|---|---|---|---|---|---|
| Example 11 | 21 | 49 | 20 | 10 | — |
| Example 12 | 21 | 49 | 20 | — | 10 |
| Example 13 | 11 | 63 | 20 | — | 6 |
| Example 14 | 2 | 76 | 20 | — | 2 |

TABLE 7-2

| Physical properties Thermoplastic resin comp. No. | Specific gravity | Melt flow rate (g/10 min) | Tensile properties Strength at yield (kg/cm²) | Tensile properties Elongation at break (%) | Flexural properties Modulus of elasticity (kg/cm²) | Flexural properties Strength (kg/cm²) |
|---|---|---|---|---|---|---|
| Example 11 | 0.971 | 6.0 | 219 | >200 | 10,300 | 287 |
| Example 12 | 0.971 | 10.5 | 221 | >200 | 9,060 | 253 |
| Example 13 | 0.971 | 10.5 | 219 | >200 | 10,230 | 281 |
| Example 14 | 0.971 | 10.5 | 216 | >200 | 11,390 | 309 |

| Physical properties | | Penetration impact | Thermal |

TABLE 7-2-continued

| Thermoplastic resin comp. No. | Izod impact strength 23° C. (kg·cm/cm) | −30° C. (kg·cm/cm) | strength (YE/TE)*1 23° C. (J: joule) | −30° C. (J: joule) | deformation temp. (°C.) | Rockwell hardness $H_R$ |
|---|---|---|---|---|---|---|
| Example 11 | 56.8 | 9.1 | 29/49 (D) | 4.2/4.5 (B) | 106 | 74 |
| Example 12 | 54.5 | 7.0 | 28/48 (D) | 4.1/4.3 (B) | 103 | 74 |
| Example 13 | 55.8 | 8.2 | 29/49 (D) | 4.3/4.7 (B) | 109 | 74 |
| Example 14 | 57.0 | 9.3 | 29/50 (D) | 4.5/5.0 (B) | 115 | 73 |

Note.
*1 Penetration impact strength, YE denotes yield point energy, TE denotes total energy, (D) and (B) indicate the states of fracture: (D): ductile fracture, (B): brittle fracture.

TABLE 8-1

| Constituent Thermoplastic resin comp. No. | Modified polypropylene (A) MS-PP-2 | Modified polypropylene (A) MS-PP-4 | Saturated polyester resin (D) PBT-1 | Epoxy group containing copolymer (E) E.MA.GMA-1 | Filler (I) GF-1 |
|---|---|---|---|---|---|
| Example 15 | 9 | 49 | 20 | 6 | 2 |
| Example 16 | 6 | 49 | 20 | 6 | 5 |
| Example 17 | 1 | 49 | 20 | 6 | 10 |

TABLE 8-2

| Physical properties Thermoplastic resin comp. No. | Specific gravity | Melt flow rate (g/10 min) | Tensile properties Strength at yield (kg/cm²) | Elongation at break (%) | Flexural properties Modulus of elasticity (kg/cm²) | Strength (kg/cm²) |
|---|---|---|---|---|---|---|
| Example 15 | 0.982 | 9.0 | 283 | 17 | 13,700 | 361 |
| Example 16 | 1.010 | 6.0 | 315 | 12 | 15,450 | 387 |
| Example 17 | 1.038 | 1.5 | 413 | 7 | 18,400 | 471 |

| Physical properties Thermoplastic resin comp. No. | Izod impact strength 23° C. (kg·cm/cm) | −30° C. (kg·cm/cm) | Penetration impact strength (YE/TE)*1 23° C. (J: joule) | −30° C. (J: joule) | Thermal deformation temp. (°C.) | Rockwell hardness $H_R$ |
|---|---|---|---|---|---|---|
| Example 15 | 29.6 | 5.1 | 21/27 (B) | 0.2/0.2 (B) | 140 | 83 |
| Example 16 | 19.2 | 4.6 | 14/19 (B) | 0.1/0.1 (B) | 148 | 86 |
| Example 17 | 19.0 | 5.9 | 8/11 (B) | 0.1/0.1 (B) | 154 | 102 |

Note.
*1 Penetration impact strength, YE denotes yield point energy, TE denotes total energy, (D) and (B) indicate the states of fracture: (D): ductile fracture, (B): brittle fracture.

TABLE 9-1

| Constituent Thermoplastic resin comp. No. | Modified polypropylene (A) MS-PP-2 | Modified polypropylene (A) MS-PP-4 | Polypropylene (B) PP-2 | Polypropylene (B) PP-4 | Saturated polyester resin (D) PBT-1 | Epoxy group containing copolymer (E) E.VA.GMA-1 |
|---|---|---|---|---|---|---|
| Example 18 | 19 | 2 | 44 | 5 | 20 | 10 |
| Example 19 | 11 | 10 | 25 | 24 | 20 | 10 |
| Example 20 | 2 | 19 | 5 | 44 | 20 | 10 |
| Comparative Example 5 | — | 21 | — | 49 | 20 | 10 |

TABLE 9-2

| Physical properties Thermoplastic resin comp. No. | Specific gravity | Melt flow rate (g/10 min) | Tensile properties Strength at yield (kg/cm²) | Elongation at break (%) | Flexural properties Modulus of elasticity (kg/cm²) | Strength (kg/cm²) |
|---|---|---|---|---|---|---|
| Example 18 | 0.971 | 5.5 | 218 | >200 | 10,220 | 285 |
| Example 19 | 0.971 | 3.4 | 214 | >200 | 9,830 | 274 |
| Example 20 | 0.971 | 1.2 | 211 | >200 | 9,440 | 262 |
| Comparative Example 5 | 0.971 | 0.7 | 210 | >200 | 9,360 | 260 |

| Physical properties Thermoplastic resin comp. No. | Izod impact strength 23° C. (kg·cm/cm) | −30° C. (kg·cm/cm) | Penetration impact strength (YE/TE)*1 23° C. (J: joule) | −30° C. (J: joule) | Thermal deformation temp. (°C.) | Rockwell hardness $H_R$ |
|---|---|---|---|---|---|---|
| Example 18 | 53.0 | 8.7 | 29/49 (D) | 3.9/4.1 (B) | 105 | 73 |

TABLE 9-2-continued

| | | | | | | |
|---|---|---|---|---|---|---|
| Example 19 | 36.0 | 7.1 | 28/48 (D) | 2.3/2.4 (B) | 101 | 68 |
| Example 20 | 18.9 | 5.4 | 26/46 (D~B) | 0.6/0.6 (B) | 97 | 64 |
| Comparative Example 5 | 15.1 | 5.0 | 25/45 (D~B) | 0.1/0.1 (B) | 96 | 63 |

Note
[*1] Penetration impact strength. YE denotes yield point energy, TE denotes total energy, (D) and (B) indicate the states of fracture: (D): ductile fracture, (B): brittle fracture.

TABLE 10-1

| Constituent Thermoplastic resin comp. No. | Modified polypropylene (A) MS-PP-1 | Saturated polyester resin (D) PBT-1 | Epoxy group containing copolymer (E) E.VA.GMA-1 | Etylenic copolymer rubber (G) EPM-1 |
|---|---|---|---|---|
| Example 21 | 70 | 5 | 10 | 15 |
| Example 22 | 65 | 10 | 10 | 15 |
| Example 23 | 55 | 20 | 10 | 15 |
| Example 24 | 45 | 30 | 10 | 15 |
| Example 25 | 40 | 35 | 10 | 15 |

TABLE 10-2

| Physical properties Thermoplastic resin comp. No. | Specific gravity | Melt flow rate (g/10 min) | Tensile properties | | Flexural properties | |
|---|---|---|---|---|---|---|
| | | | Strength at yield (kg/cm$^2$) | Elongation at break (%) | Modulus of elasticity (kg/cm$^2$) | Strength (kg/cm$^2$) |
| Example 21 | 0.924 | 1.7 | 199 | >200 | 8,090 | 227 |
| Example 22 | 0.938 | 1.6 | 197 | >200 | 8,020 | 227 |
| Example 23 | 0.971 | 0.7 | 193 | >200 | 8,390 | 225 |
| Example 24 | 1.006 | 0.1 | 215 | >200 | 8,390 | 251 |
| Example 25 | 1.023 | 0.1 | 224 | >200 | 8,690 | 270 |

| Physical properties Thermoplastic resin comp. No. | Izod impact strength | | Penetration impact strength (YE/TE)[*1] | | Thermal deformation temp. (°C.) | Rockwell hardness H$_R$ |
|---|---|---|---|---|---|---|
| | 23° C. (kg·cm/cm) | −30° C. | 23° C. (J: joule) | −30° C. | | |
| Example 21 | 56.0 | 4.8 | 24/46 (D) | 0.3/0.3 (B) | 98 | 74 |
| Example 22 | 57.6 | 5.0 | 25/46 (D) | 0.3/0.3 (B) | 97 | 72 |
| Example 23 | 62.0 | 6.9 | 27/47 (D) | 0.2/0.2 (B) | 94 | 71 |
| Example 24 | 11.4 | 5.8 | 19/28 (B) | 0.2/0.2 (B) | 94 | 73 |
| Example 25 | 10.7 | 5.9 | 14/27 (B) | 0.2/0.2 (B) | 94 | 75 |

Note
[*1] Penetration impact strength. YE denotes yield point energy, TE denotes total energy, (D) and (B) indicate the states of fracture: (D): ductile fracture, (B): brittle fracture.

TABLE 11-1

| Constituent Thermoplastic resin comp. No. | Modified polypropylene (A) MS-PP-1 | Saturated polyester resin (D) PBT-1 | Epoxy group containing copolymer (E) E.VA.GMA-1 | Etylenic copolymer rubber (G) EPM-1 |
|---|---|---|---|---|
| Example 26 | 49 | 20 | 10 | 21 |
| Example 27 | 52 | 20 | 10 | 18 |
| Example 28 | 60 | 20 | 10 | 10 |
| Example 29 | 65 | 20 | 10 | 5 |

TABLE 11-2

| Physical properties Thermoplastic resin comp. No. | Specific gravity | Melt flow rate (g/10 min) | Tensile properties | | Flexural properties | |
|---|---|---|---|---|---|---|
| | | | Strength at yield (kg/cm$^2$) | Elongation at break (%) | Modulus of elasticity (kg/cm$^2$) | Strength (kg/cm$^2$) |
| Example 26 | 0.966 | 0.5 | 169 | >200 | 7,010 | 188 |
| Example 27 | 0.971 | 0.6 | 176 | >200 | 8,000 | 201 |
| Example 28 | 0.975 | 1.1 | 213 | >200 | 10,060 | 255 |
| Example 29 | 0.978 | 1.9 | 241 | >200 | 10,970 | 294 |

| Physical properties Thermoplastic resin comp. No. | Izod impact strength | | Penetration impact strength (YE/TE)[*1] | | Thermal deformation temp. (°C.) | Rockwell hardness H$_R$ |
|---|---|---|---|---|---|---|
| | 23° C. (kg·cm/cm) | −30° C. | 23° C. (J: joule) | −30° C. | | |
| Example 26 | 82.7 | 15.1 | 29/49 (D) | 29/45 (D~B) | 82 | 51 |

TABLE 11-2-continued

| | | | | | | |
|---|---|---|---|---|---|---|
| Example 27 | 76.1 | 12.6 | 29/49 (D) | 25/30 (B) | 88 | 59 |
| Example 28 | 15.0 | 5.9 | 29/44 (D~B) | 0.2/0.2 (B) | 102 | 74' |
| Example 29 | 8.1 | 4.7 | 27/31 (B) | 0.2/0.2 (B) | 110 | 81 |

Note:
*¹Penetration impact strength, YE denotes yield point energy, TE denotes total energy, (D) and (B) indicate the states of fracture: (D): ductile fracture, (B): brittle fracture.

TABLE 12-1

| Constituent Thermoplastic resin comp. No. | Modified polypropylene (A) MS-PP-1 | Saturated polyester resin (D) PBT-1 | Epoxy group containing copolymer (E) E.VA.GMA-1 | Ethylenic copolymer rubber (G) EPM-1 |
|---|---|---|---|---|
| Example 30 | 49 | 20 | 5 | 26 |
| Example 31 | 49 | 20 | 2 | 29 |
| Example 32 | 49 | 20 | 1 | 30 |
| Comparative Example 6 | 49 | 20 | — | 31 |

TABLE 12-2

| Physical properties Thermoplastic resin comp. No. | Specific gravity | Melt flow rate (g/10 min) | Tensile properties Strength at yield (kg/cm²) | Tensile properties Elongation at break (%) | Flexural properties Modulus of elasticity (kg/cm²) | Flexural properties Strength (kg/cm²) |
|---|---|---|---|---|---|---|
| Example 30 | 0.961 | 1.4 | 159 | >200 | 7,560 | 197 |
| Example 31 | 0.958 | 2.3 | 150 | >200 | 7,180 | 198 |
| Example 32 | 0.958 | 3.8 | 151 | >200 | 7,400 | 203 |
| Comparative Example 6 | 0.958 | 8.6 | 143 | 175 | 7,640 | 196 |

| Physical properties Thermoplastic resin comp. No. | Izod impact strength 23° C. (kg·cm/cm) | Izod impact strength −30° C. (kg·cm/cm) | Penetration impact strength (YE/TE)*¹ 23° C. (J: joule) | Penetration impact strength (YE/TE)*¹ −30° C. (J: joule) | Thermal deformation temp. (°C.) | Rockwell hardness $H_R$ |
|---|---|---|---|---|---|---|
| Example 30 | 80.1 | 9.5 | 29/49 (D) | 29/44 (D~B) | 83 | 52 |
| Example 31 | 79.2 | 8.0 | 29/43 (D~B) | 29/42 (D~B) | 78 | 50 |
| Example 32 | 73.1 | 7.2 | 27/39 (D~B) | 26/33 (D~B) | 86 | 50 |
| Comparative Example 6 | 49.2 | 5.4 | 25/31 (B) | 19/24 (B) | 83 | 50 |

Note:
*¹Penetration impact strength, YE denotes yield point energy, TE denotes total energy, (D) and (B) indicate the states of fracture: (D): ductile fracture, (B): brittle fracture.

TABLE 13-1

| Constituent Thermoplastic resin comp. No. | Modified polypropylene (A) MS-PP-1 | Saturated polyester resin (D) PBT-1 | Epoxy group containing copolymer (E) E.VA.GMA-1 | Ethylenic copolymer rubber (G) EPM-1 | Basic compound (E) Sumicure ® BD |
|---|---|---|---|---|---|
| Example 33 | 55 | 20 | 10 | 15 | 0.5 |

TABLE 13-2

| Physical properties Thermoplastic resin comp. No. | Specific gravity | Melt flow rate (g/10 min) | Tensile properties Strength at yield (kg/cm²) | Tensile properties Elongation at break (%) | Flexural properties Modulus of elasticity (kg/cm²) | Flexural properties Strength (kg/cm²) |
|---|---|---|---|---|---|---|
| Example 33 | 0.971 | 0.2 | 206 | >200 | 8,470 | 234 |

| Physical properties Thermoplastic resin comp. No. | Izod impact strength 23° C. (kg·cm/cm) | Izod impact strength −30° C. (kg·cm/cm) | Penetration impact strength (YE/TE)*¹ 23° C. (J: joule) | Penetration impact strength (YE/TE)*¹ −30° C. (J: joule) | Thermal deformation temp. (°C.) | Rockwell hardness $H_R$ |
|---|---|---|---|---|---|---|
| Example 33 | 83.1 | 8.7 | 28/49 (D) | 0.3/0.3 | 99 | 77 |

Note: *¹penetration impact strength, YE denotes yield point energy, TE denotes total energy, (D) and (B) indicate the states of fracture: (D): ductile fracture, (B): brittle fracture.

TABLE 14-1

| Constituent Thermoplastic resin comp. No. | Modified polypropylene (A) MS-PP-1 | Saturated polyester resin (D) PBT-1 | Epoxy group containing copolymer (E) E.VA.GMA-1 | Ethylenic copolymer rubber (G) EPM-1 |
|---|---|---|---|---|
| Example 34 | 55 | 20 | 10 | 15 |

TABLE 14-2

| Physical properties Thermoplastic resin comp. No. | Specific gravity | Melt flow rate (g/10 min) | Tensile properties | | Flexural properties | |
|---|---|---|---|---|---|---|
| | | | Strength at yield (kg/cm²) | Elongation at break (%) | Modulus of elasticity (kg/cm²) | Strength (kg/cm²) |
| Example 34 | 0.971 | 0.8 | 214 | >200 | 9,490 | 267 |

| Physical properties Thermoplastic resin comp. No. | Izod impact strength | | Penetration impact strength (YE/TE)*¹ | | Thermal deformation temp. (°C.) | Rockwell hardness $H_R$ |
|---|---|---|---|---|---|---|
| | 23° C. (kg · cm/cm) | −30° C. | 23° C. (J: joule) | −30° C. | | |
| Example 34 | 62.5 | 7.0 | 27/47 (D) | 0.3/0.3 (B) | 100 | 75 |

Note. *¹Penetration impact strength, YE denotes yield point energy, TE denotes total energy, (D) and (B) indicate the states of fracture: (D): ductile fracture, (B): brittle fracture.

TABLE 15-1

| Constituent Thermoplastic resin comp. No. | Modified polypropylene (A) MS-PP-2 | Saturated polyester resin (D) PBT-1 | Epoxy group containing copolymer (E) E.VA.GMA-1 | Ethylenic copolymer rubber (G) EPM-2 |
|---|---|---|---|---|
| Example 35 | 55 | 20 | 10 | 15 |

TABLE 15-2

| Physical properties Thermoplastic resin comp. No. | Specific gravity | Melt flow rate (g/10 min) | Tensile properties | | Flexural properties | |
|---|---|---|---|---|---|---|
| | | | Strength at yield (kg/cm²) | Elongation at break (%) | Modulus of elasticity (kg/cm²) | Strength (kg/cm²) |
| Example 35 | 0.968 | 0.5 | 191 | >200 | 8,220 | 224 |

| Physical properties Thermoplastic resin comp. No. | Izod impact strength | | Penetration impact strength (YE/TE)*¹ | | Thermal deformation temp. (°C.) | Rockwell hardness $H_R$ |
|---|---|---|---|---|---|---|
| | 23° C. (kg · cm/cm) | −30° C. | 23° C. (J: joule) | −30° C. | | |
| Example 35 | 82.5 | 8.4 | 29/49 (D) | 0.4/0.4 (B) | 93 | 62 |

Note *¹Penetration impact strength, YE denotes yield point energy, TE denotes total energy, (D) and (B) indicate the states of fracture: (D): ductile fracture, (B): brittle fracture.

TABLE 16-1

| Constituent Thermoplastic resin comp. No. | Modified polypropylene (A) MS-PP-2 | Saturated polyester resin (D) PBT-1 | Saturated polyester resin (D) PET-1 | Epoxy group containing copolymer (E) E.VA.GMA-1 | Ethylenic copolymer rubber (G) EPM-2 |
|---|---|---|---|---|---|
| Example 36 | 55 | 10 | 10 | 10 | 15 |
| Example 37 | 55 | — | 20 | 10 | 15 |

TABLE 16-2

| Physical properties Thermoplastic resin comp. No. | Specific gravity | Melt flow rate (g/10 min) | Tensile properties | | Flexural properties | |
|---|---|---|---|---|---|---|
| | | | Strength at yield (kg/cm²) | Elongation at break (%) | Modulus of elasticity (kg/cm²) | Strength (kg/cm²) |
| Example 36 | 0.973 | 0.5 | 206 | >200 | 9,840 | 250 |
| Example 37 | 0.978 | 0.5 | 222 | >200 | 11,460 | 277 |

| Physical properties Thermoplastic resin comp. | Izod impact strength | | Penetration impact strength (YE/TE)*¹ | | Thermal deformation temp. | Rockwell hardness |
|---|---|---|---|---|---|---|
| | 23° C. | −30° C. | 23° C. | −30° C. | | |

TABLE 16-2-continued

| No. | (kg · cm/cm) | | (J: joule) | | (°C.) | $H_R$ |
|---|---|---|---|---|---|---|
| Example 36 | 36.9 | 6.8 | 29/41 (D~B) | 0.3/0.3 (B) | 109 | 67 |
| Example 37 | 31.4 | 5.2 | 27/34 (B) | 0.2/0.2 (B) | 125 | 72 |

Note: *¹Penetration impact strength, YE denotes yield point energy, TE denotes total energy. (D) and (B) indicate the states of fracture: (D): ductile fracture, (B): brittle fracture.

TABLE 17-1

| Constituent Thermoplastic resin comp. No. | Modified polypropylene (A) MS-PP-2 | Saturated polyester resin (D) PBT-1 | Epoxy group containing copolymer (E) E.MA.GMA-1 | Ethylenic copolymer rubber (G) EPM-2 |
|---|---|---|---|---|
| Example 38 | 55 | 20 | 2 | 23 |
| Example 39 | 55 | 20 | 10 | 15 |

TABLE 17-2

| Physical properties Thermoplastic resin comp. No. | Specific gravity | Melt flow rate (g/10 min) | Tensile properties | | Flexural properties | |
|---|---|---|---|---|---|---|
| | | | Strength at yield (kg/cm²) | Elongation at break (%) | Modulus of elasticity (kg/cm²) | Strength (kg/cm²) |
| Example 38 | 0.968 | 0.9 | 188 | >200 | 9,090 | 241 |
| Example 39 | 0.968 | 0.9 | 195 | >200 | 7,230 | 197 |

| Physical properties Thermoplastic resin comp. No. | Izod impact strength | | Penetration impact strength (YE/TE)*¹ | | Thermal deformation temp. (°C.) | Rockwell hardness $H_R$ |
|---|---|---|---|---|---|---|
| | 23° C. (kg · cm/cm) | −30° C. | 23° C. (J: joule) | −30° C. | | |
| Example 38 | 83.0 | 8.6 | 30/50 (D) | 0.4/0.4 (B) | 101 | 61 |
| Example 39 | 79.2 | 6.5 | 28/49 (D) | 0.3/0.3 (B) | 90 | 62 |

Note: *¹Penetration impact strength, YE denotes yield point energy, TE denotes total energy, (D) and (B) indicate the states of fracture: (D): ductile fracture, (B): brittle fracture.

TABLE 18-1

| Constituent Thermoplastic resin comp. No. | Modified polypropylene (A) MS-PP-2 | Saturated polyester resin (D) PBT-1 | Epoxy group containing copolymer (E) E.VA.GMA-1 | Ethylenic copolymer rubber (G) EPM-2 | Filler (I) GF-1 |
|---|---|---|---|---|---|
| Example 40 | 53 | 20 | 2 | 23 | 2 |
| Example 41 | 50 | 20 | 2 | 23 | 5 |
| Example 42 | 45 | 20 | 2 | 23 | 10 |

TABLE 18-2

| Physical properties Thermoplastic resin comp. No. | Specific gravity | Melt flow rate (g/10 min) | Tensile properties | | Flexural properties | |
|---|---|---|---|---|---|---|
| | | | Strength at yield (kg/cm²) | Elongation at break (%) | Modulus of elasticity (kg/cm²) | Strength (kg/cm²) |
| Example 40 | 0.979 | 0.8 | 242 | 19 | 12,170 | 309 |
| Example 41 | 1,007 | 0.5 | 271 | 12 | 13,730 | 332 |
| Example 42 | 1,035 | 0.1 | 355 | 10 | 16,350 | 405 |

| Physical properties Thermoplastic resin comp. No. | Izod impact strength | | Penetration impact strength (YE/TE)*¹ | | Thermal deformation temp. (°C.) | Rockwell hardness $H_R$ |
|---|---|---|---|---|---|---|
| | 23° C. (kg · cm/cm) | −30° C. | 23° C. (J: joule) | −30° C. | | |
| Example 40 | 44.0 | 5.4 | 23/28 (B) | 0.2/0.2 (B) | 129 | 69 |
| Example 41 | 28.2 | 4.9 | 15/19 (B) | 0.1/0.1 (B) | 137 | 71 |
| Example 42 | 28.1 | 6.2 | 10/13 (B) | 0.1/0.1 (B) | 142 | 85 |

Note: *¹Penetration impact strength, YE denotes yield point energy, TE denotes total energy, (D) and (B) indicate the states of fracture: (D): ductile fracture, (B): brittle fracture.

TABLE 19-1

| Constituent Thermoplastic resin comp. No. | Modified polypropylene (A) MS-PP-2 | Polypropylene (B) PP-1 | Saturated polyester resin (D) PBT-1 | Epoxy group containing copolymer (E) E.MA.GMA-1 | Ethylenic copolymer rubber (G) EPM-2 |
|---|---|---|---|---|---|
| Example 43 | 50 | 5 | 20 | 10 | 15 |

TABLE 19-1-continued

| Constituent Thermoplastic resin comp. No. | Modified polypropylene (A) MS-PP-2 | Polypropylene (B) PP-1 | Saturated polyester resin (D) PBT-1 | Epoxy group containing copolymer (E) E.MA.GMA-1 | Ethylenic copolymer rubber (G) EPM-2 |
|---|---|---|---|---|---|
| Example 44 | 22.5 | 22.5 | 20 | 10 | 15 |
| Example 45 | 5 | 50 | 20 | 10 | 15 |

TABLE 19-2

| Physical properties Thermoplastic resin comp. No. | Specific gravity | Melt flow rate (g/10 min) | Tensile properties | | Flexural properties | |
|---|---|---|---|---|---|---|
| | | | Strength at yield (kg/cm²) | Elongation at break (%) | Modulus of elasticity (kg/cm²) | Strength (kg/cm²) |
| Example 43 | 0.971 | 0.7 | 194 | >200 | 8,330 | 224 |
| Example 44 | 0.971 | 0.6 | 199 | >200 | 8,050 | 221 |
| Example 45 | 0.971 | 0.5 | 204 | >200 | 7,770 | 218 |

| Physical properties Thermoplastic resin comp. No. | Izod impact strength | | Penetration impact strength (YE/TE)[*1] | | Thermal deformation temp. (°C.) | Rockwell hardness $H_R$ |
|---|---|---|---|---|---|---|
| | 23° C. (kg·cm/cm) | −30° C. | 23° C. (J: joule) | −30° C. | | |
| Example 43 | 77.9 | 6.8 | 28/44 (D) | 0.2/0.2 (B) | 92 | 70 |
| Example 44 | 70.7 | 6.2 | 29/45 (D) | 0.2/0.2 (B) | 87 | 65 |
| Example 45 | 63.6 | 5.6 | 28/43 (D∼B) | 0.2/0.2 (B) | 82 | 60 |

Note: [*1] Penetration impact strength. YE denotes yield point energy, TE denotes total energy, (D) and (B) indicate the states of fracture: (D): ductile fracture, (B): brittle fracture.

TABLE 20-1

| Constituent Thermoplastic resin comp. No. | Modified polypropylene (A) MS-PP-1 | Saturated polyester resin (D) PBT-1 | Epoxy group containing copolymer (E) E.Va.GMA-1 | Modified ethylenic copolymer rubber (H) M-EPM-1 |
|---|---|---|---|---|
| Example 46 | 70 | 5 | 10 | 15 |
| Example 47 | 65 | 10 | 10 | 15 |
| Example 48 | 55 | 20 | 10 | 15 |
| Example 49 | 45 | 30 | 10 | 15 |
| Example 50 | 40 | 35 | 10 | 15 |

TABLE 20-2

| Physical properties Thermoplastic resin comp. No. | Specific gravity | Melt flow rate (g/10 min) | Tensile properties | | Flexural properties | |
|---|---|---|---|---|---|---|
| | | | Strength at yield (kg/cm²) | Elongation at break (%) | Modulus of elasticity (kg/cm²) | Strength (kg/cm²) |
| Example 46 | 0.924 | 2.2 | 201 | >200 | 8,270 | 248 |
| Example 47 | 0.938 | 2.1 | 200 | >200 | 8,190 | 248 |
| Example 48 | 0.971 | 0.9 | 195 | >200 | 8,570 | 246 |
| Example 49 | 1.006 | 0.1 | 216 | >200 | 8,570 | 274 |
| Example 50 | 1.023 | 0.1 | 227 | >200 | 8,720 | 284 |

| Physical properties Thermoplastic resin comp. No. | Izod impact strength | | Penetration impact strength (YE/TE)[*1] | | Thermal deformation temp. (°C.) | Rockwell hardness $H_R$ |
|---|---|---|---|---|---|---|
| | 23° C. (kg·cm/cm) | −30° C. | 23° C. (J: joule) | −30° C. | | |
| Example 46 | 71.0 | 5.0 | 26/48 (D) | 0.3/0.3 (B) | 94 | 66 |
| Example 47 | 73.1 | 5.2 | 27/48 (D) | 0.3/0.3 (B) | 94 | 65 |
| Example 48 | 78.6 | 8.0 | 29/47 (D) | 0.2/0.2 (B) | 91 | 64 |
| Example 49 | 14.6 | 6.2 | 10/31 (B) | 0.2/0.2 (B) | 91 | 65 |
| Example 50 | 13.9 | 6.4 | 15/28 (B) | 0.2/0.2 (B) | 91 | 68 |

Note: [*1] Penetration impact strength. YE denotes yield point energy, TE denotes total energy, (D) and (B) indicate the states of fracture: (D): ductile fracture, (B): brittle fracture.

TABLE 21-1

| Constituent Thermoplastic resin comp. No. | Modified polypropylene (A) MS-PP-1 | Saturated polyester resin (D) PBT-1 | Epoxy group containing copolymer (E) E.Va.GMA-1 | Modified ethylenic copolymer rubber (H) M-EPM-1 |
|---|---|---|---|---|
| Example 51 | 49 | 20 | 10 | 21 |
| Example 52 | 52 | 20 | 10 | 18 |
| Example 53 | 60 | 20 | 10 | 10 |
| Example 54 | 65 | 20 | 10 | 5 |

TABLE 21-2

| Physical properties Thermoplastic resin comp. No. | Specific gravity | Melt flow rate (g/10 min) | Tensile properties | | Flexural properties | |
|---|---|---|---|---|---|---|
| | | | Strength at yield (kg/cm$^2$) | Elongation at break (%) | Modulus of elasticity (kg/cm$^2$) | Strength (kg/cm$^2$) |
| Example 51 | 0.966 | 0.6 | 162 | >200 | 7,160 | 206 |
| Example 52 | 0.971 | 0.8 | 173 | >200 | 8,170 | 220 |
| Example 53 | 0.975 | 1.4 | 210 | >200 | 10,270 | 279 |
| Example 54 | 0.978 | 2.4 | 238 | >200 | 11,200 | 321 |

| Physical properties Thermoplastic resin comp. No. | Izod impact strength (kg · cm/cm) | | Penetration impact strength (YE/TE)[*1] (J: joule) | | Thermal deformation temp. (°C.) | Rockwell hardness H$_R$ |
|---|---|---|---|---|---|---|
| | 23° C. | −30° C. | 23° C. | −30° C. | | |
| Example 51 | 82.7 | 17.5 | 29/49 (D) | 22/33 (B) | 79 | 45 |
| Example 52 | 77.6 | 14.7 | 28/48 (D) | 18/25 (B) | 84 | 53 |
| Example 53 | 18.9 | 6.8 | 29/43 (D) | 0.2/0.2 (B) | 99 | 66 |
| Example 54 | 14.2 | 5.4 | 27/40 (D~B) | 0.2/0.2 (B) | 106 | 73 |

Note: [*1] Penetration impact strength, YE denotes yield point energy, TE denotes total energy, (D) and (B) indicate the states of fracture: (D): ductile fracture, (B): brittle fracture.

TABLE 22-1

| Constituent Thermoplastic resin comp. No. | Modified polypropylene (A) MS-PP-1 | Saturated polyester resin (D) PBT-1 | Epoxy group containing copolymer (E) E.Va.GMA-1 | Modified ethylenic copolymer rubber (H) M-EPM-1 |
|---|---|---|---|---|
| Example 55 | 49 | 20 | 5 | 26 |
| Example 56 | 49 | 20 | 2 | 29 |
| Example 57 | 49 | 20 | 1 | 30 |
| Comparative Example 7 | 49 | 20 | — | 31 |

TABLE 22-2

| Physical properties Thermoplastic resin comp. No. | Specific gravity | Melt flow rate (g/10 min) | Tensile properties | | Flexural properties | |
|---|---|---|---|---|---|---|
| | | | Strength at yield (kg/cm$^2$) | Elongation at break (%) | Modulus of elasticity (kg/cm$^2$) | Strength (kg/cm$^2$) |
| Example 55 | 0.961 | 1.2 | 152 | >200 | 7,720 | 216 |
| Example 56 | 0.958 | 1.9 | 144 | >200 | 7,330 | 217 |
| Example 57 | 0.958 | 3.2 | 145 | >200 | 7,560 | 222 |
| Comparative Example 7 | 0.958 | 7.2 | 137 | 154 | 7,800 | 215 |

| Physical properties Thermoplastic resin comp. No. | Izod impact strength (kg · cm/cm) | | Penetration impact strength (YE/TE)[*1] (J: joule) | | Thermal deformation temp. (°C.) | Rockwell hardness H$_R$ |
|---|---|---|---|---|---|---|
| | 23° C. | −30° C. | 23° C. | −30° C. | | |
| Example 55 | 81.6 | 10.6 | 29/49 (D) | 21/32 (B) | 80 | 46 |
| Example 56 | 78.5 | 8.8 | 29/45 (D~B) | 19/30 (B) | 75 | 44 |
| Example 57 | 72.1 | 7.8 | 28/41 (D~B) | 18/25 (B) | 83 | 44 |
| Comparative Example 7 | 45.3 | 6.0 | 24/34 (B) | 16/18 (B) | 80 | 44 |

Note: [*1] Penetration impact strength, YE denotes yield point energy, TE denotes total energy, (D) and (B) indicate the states of fracture: (D): ductile fracture, (B): brittle fracture.

TABLE 23-1

| Constituent Thermoplastic resin comp. No. | Modified polypropylene (A) MS-PP-1 | Saturated polyester resin (D) PBT-1 | Epoxy group containing copolymer (E) E.Va.GMA-1 | Modified ethylenic copolymer rubber (H) M-EPM-1 | Basic compound (I) Sumicure ® BD |
|---|---|---|---|---|---|
| Example 58 | 55 | 20 | 10 | 15 | 0.5 |

TABLE 23-2

| Physical properties Thermoplastic resin comp. No. | Specific gravity | Melt flow rate (g/10 min) | Tensile properties | | Flexural properties | |
|---|---|---|---|---|---|---|
| | | | Strength at yield (kg/cm²) | Elongation at break (%) | Modulus of elasticity (kg/cm²) | Strength (kg/cm²) |
| Example 58 | 0.971 | 0.3 | 208 | >200 | 8,650 | 255 |

| Physical properties Thermoplastic resin comp. No. | Izod impact strength | | Penetration impact strength (YE/TE)*¹ | | Thermal deformation temp. (°C.) | Rockwell hardness $H_R$ |
|---|---|---|---|---|---|---|
| | 23° C. (kg · cm/cm) | −30° C. | 23° C. (J: joule) | −30° C. | | |
| Example 58 | 82.6 | 10.4 | 29/49 (D) | 0.3/0.3 (B) | 96 | 70 |

Note *¹Penetration impact strength. YE denotes yield point energy, TE denotes total energy. (D) and (B) indicate the states of fracture: (D): ductile fracture, (B): brittle fracture, (D~B): intermediate fracture state between (B) and (D)

TABLE 24-1

| Constituent Thermoplastic resin comp. No. | Modified polypropylene (A) MS-PP-2 | Saturated polyester resin (D) PBT-1 | Epoxy group containing copolymer (E) E.Va.GMA-1 | Modified ethylenic copolymer rubber (H) M-EPM-1 |
|---|---|---|---|---|
| Example 59 | 55 | 20 | 10 | 15 |

TABLE 24-2

| Physical properties Thermoplastic resin comp. No. | Specific gravity | Melt flow rate (g/10 min) | Tensile properties | | Flexural properties | |
|---|---|---|---|---|---|---|
| | | | Strength at yield (kg/cm²) | Elongation at break (%) | Modulus of elasticity (kg/cm²) | Strength (kg/cm²) |
| Example 59 | 0.971 | 1.0 | 216 | >200 | 9,670 | 288 |

| Physical properties Thermoplastic resin comp. No. | Izod impact strength | | Penetration impact strength (YE/TE)*¹ | | Thermal deformation temp. (°C.) | Rockwell hardness $H_R$ |
|---|---|---|---|---|---|---|
| | 23° C. (kg · cm/cm) | −30° C. | 23° C. (J: joule) | −30° C. | | |
| Example 59 | 78.9 | 8.1 | 29/49 (D) | 0.3/0.3 (B) | 97 | 68 |

Note *¹Penetration impact strength. YE denotes yield point energy, TE denotes total energy, (D) and (B) indicate the states of fracture: (D): ductile fracture, (B): brittle fracture.

TABLE 25-1

| Constituent Thermoplastic resin comp. No. | Modified polypropylene (A) MS-PP-2 | Saturated polyester resin (D) PBT-1 | Epoxy group containing copolymer (E) E.Va.GMA-1 | Modified ethylenic copolymer rubber (H) M-EPM-2 |
|---|---|---|---|---|
| Example 60 | 55 | 20 | 10 | 15 |

TABLE 25-2

| Physical properties Thermoplastic resin comp. No. | Specific gravity | Melt flow rate (g/10 min) | Tensile properties | | Flexural properties | |
|---|---|---|---|---|---|---|
| | | | Strength at yield (kg/cm²) | Elongation at break (%) | Modulus of elasticity (kg/cm²) | Strength (kg/cm²) |
| Example 60 | 0.968 | 0.6 | 193 | >200 | 8,370 | 242 |

| Physical properties Thermoplastic | Izod impact strength | Penetration impact strength (YE/TE)*¹ | Thermal deformation | Rockwell |

TABLE 25-2-continued

| resin comp. No. | 23° C. (kg · cm/cm) | −30° C. | 23° C. (J: joule) | −30° C. | tion temp. (°C.) | hardness $H_R$ |
|---|---|---|---|---|---|---|
| Example 60 | 83.1 | 9.7 | 30/49 (D) | 0.4/0.4 (B) | 90 | 56 |

Note: *[1] Penetration impact strength, YE denotes yield point energy, TE denotes total energy, (D) and (B) indicate the states of fracture: (D): ductile fracture, (B): brittle fracture.

TABLE 26-1

| Constituent Thermoplastic resin comp. No. | Modified polypropylene (A) MS-PP-2 | Saturated polyester resin (D) PBT-1 | Saturated polyester resin (D) PET-1 | Epoxy group containing copolymer (E) E.VA.GMA-1 | Modified ethylenic copolymer rubber (H) M-EPM-2 |
|---|---|---|---|---|---|
| Example 61 | 55 | 10 | 10 | 10 | 15 |
| Example 62 | 55 | — | 20 | 10 | 15 |

TABLE 26-2

| Physical properties Thermoplastic resin comp. No. | Specific gravity | Melt flow rate (g/10 min) | Tensile properties | | Flexural properties | |
|---|---|---|---|---|---|---|
| | | | Strength at yield (kg/cm²) | Elongation at break (%) | Modulus of elasticity (kg/cm²) | Strength (kg/cm²) |
| Example 61 | 0.973 | 0.6 | 209 | >200 | 10,040 | 272 |
| Example 62 | 0.978 | 0.6 | 225 | >200 | 11,700 | 303 |

| Physical properties Thermoplastic resin comp. No. | Izod impact strength | | Penetration impact strength (YE/TE)*[1] | | Thermal deformation temp. (°C.) | Rockwell hardness $H_R$ |
|---|---|---|---|---|---|---|
| | 23° C. (kg · cm/cm) | −30° C. | 23° C. (J: joule) | −30° C. | | |
| Example 61 | 37.3 | 7.7 | 29/41 (D~B) | 0.3/0.3 (B) | 105 | 60 |
| Example 62 | 31.6 | 5.7 | 27/34 (B) | 0.2/0.2 (B) | 120 | 64 |

Note: *[1] Penetration impact strength, YE denotes yield point energy, TE denotes total energy, (D) and (B) indicate the states of fracture: (D): ductile fracture, (B): brittle fracture.

TABLE 27-1

| Constituent Thermoplastic resin comp. No. | Modified polypropylene (A) MS-PP-2 | Saturated polyester resin (D) PBT-1 | Epoxy group containing copolymer (E) E.MA.GMA-1 | Modified ethylenic copolymer rubber (H) M-EPM-2 |
|---|---|---|---|---|
| Example 63 | 55 | 20 | 2 | 23 |
| Example 64 | 55 | 20 | 10 | 15 |

TABLE 27-2

| Physical properties Thermoplastic resin comp. No. | Specific gravity | Melt flow rate (g/10 min) | Tensile properties | | Flexural properties | |
|---|---|---|---|---|---|---|
| | | | Strength at yield (kg/cm²) | Elongation at break (%) | Modulus of elasticity (kg/cm²) | Strength (kg/cm²) |
| Example 63 | 0.968 | 1.1 | 190 | >200 | 9,260 | 260 |
| Example 64 | 0.968 | 1.0 | 196 | >200 | 7,370 | 204 |

| Izod impact strength | | Penetration impact strength (YE/TE)*[1] | | Thermal deformation temp. (°C.) | Rockwell hardness $H_R$ |
|---|---|---|---|---|---|
| 23° C. (kg · cm/cm) | −30° C. | 23° C. (J: joule) | −30° C. | | |
| 83.4 | 10.0 | 29/48 (D) | 0.4/0.4 (B) | 98 | 55 |
| 79.8 | 7.4 | 28/49 (D) | 0.3/0.3 (B) | 87 | 56 |

Note: *[1] Penetration impact strength, YE denotes yield point energy, TE denotes total energy, (D) and (B) indicate the states of fracture: (D): ductile fracture, (B): brittle fracture.

TABLE 28-1

| Constituent Thermoplastic resin comp. No. | Modified polypropylene (A) MS-PP-2 | Saturated polyester resin (D) PBT-1 | Epoxy group containing copolymer (E) E.MA.GMA-1 | Modified ethylenic copolymer rubber (H) MS-EPM-2 | Filler (I) GF-1 |
|---|---|---|---|---|---|
| Example 65 | 53 | 20 | 2 | 23 | 2 |

TABLE 28-1-continued

| Constituent Thermoplastic resin comp. No. | Modified polypropylene (A) MS-PP-2 | Saturated polyester resin (D) PBT-1 | Epoxy group containing copolymer (E) E.MA.GMA-1 | Modified ethylenic copolymer rubber (H) MS-EPM-2 | Filler (I) GF-1 |
|---|---|---|---|---|---|
| Example 66 | 50 | 20 | 2 | 23 | 5 |
| Example 67 | 45 | 20 | 2 | 23 | 10 |

TABLE 28-2

| Physical properties Thermoplastic resin comp. No. | Specific gravity | Melt flow rate (g/10 min) | Tensile properties Strength at yield (kg/cm$^2$) | Tensile properties Elongation at break (%) | Flexural properties Modulus of elasticity (kg/cm$^2$) | Flexural properties Strength (kg/cm$^2$) |
|---|---|---|---|---|---|---|
| Example 65 | 0.979 | 1.0 | 245 | 20 | 12,400 | 334 |
| Example 66 | 1.007 | 0.6 | 274 | 13 | 13,980 | 393 |
| Example 67 | 1.035 | 0.1 | 358 | 10 | 16,660 | 436 |

| Izod impact strength 23° C. (kg · cm/cm) | Izod impact strength −30° C. | Penetration impact strength (YE/TE)[*1] 23° C. (J: joule) | Penetration impact strength (YE/TE)[*1] −30° C. | Thermal deformation temp. (°C.) | Rockwell hardness H$_R$ |
|---|---|---|---|---|---|
| 44.3 | 6.2 | 22/26 (B) | 0.2/0.2 (B) | 125 | 62 |
| 28.4 | 5.7 | 14/18 (B) | 0.1/0.1 (B) | 133 | 64 |
| 28.3 | 7.2 | 10/12 (B) | 0.1/0.1 (B) | 138 | 76 |

Note.
[*1] Penetration impact strength, YE denotes yield point energy, TE denotes total energy, (D) and (B) indicate the states of fracture: (D): ductile fracture, (B): brittle fracture

TABLE 29-1

| Constituent Thermoplastic resin comp. No. | Modified polypropylene (A) MS-PP-1 | Polypropylene (B) PP-1 | Saturated polyester resin (D) PBT-1 | Epoxy group containing copolymer (E) E.VA.GMA-1 | Modified ethylenic copolymer rubber (H) M-EPM-1 |
|---|---|---|---|---|---|
| Example 68 | 50 | 5 | 20 | 10 | 15 |
| Example 69 | 22.5 | 22.5 | 20 | 10 | 15 |
| Example 70 | 5 | 50 | 20 | 10 | 15 |

TABLE 29-2

| Physical properties Thermoplastic resin comp. No. | Specific gravity | Melt flow rate (g/10 min) | Tensile properties Strength at yield (kg/cm$^2$) | Tensile properties Elongation at break (%) | Flexural properties Modulus of elasticity (kg/cm$^2$) | Flexural properties Strength (kg/cm$^2$) |
|---|---|---|---|---|---|---|
| Example 68 | 0.971 | 0.9 | 196 | >200 | 8,490 | 243 |
| Example 69 | 0.971 | 0.7 | 200 | >200 | 8,140 | 231 |
| Example 70 | 0.971 | 0.5 | 204 | >200 | 7,790 | 220 |

| Izod impact strength 23° C. (kg · cm/cm) | Izod impact strength −30° C. | Penetration impact strength (YE/TE)[*1] 23° C. (J: joule) | Penetration impact strength (YE/TE)[*1] −30° C. | Thermal deformation temp. (°C.) | Rockwell hardness H$_R$ |
|---|---|---|---|---|---|
| 78.6 | 7.8 | 29/47 (D) | 0.2/0.2 (B) | 90 | 64 |
| 78.2 | 6.8 | 28/46 (D) | 0.2/0.2 (B) | 86 | 62 |
| 78.7 | 5.7 | 28/45 (D~B) | 0.2/0.2 (B) | 82 | 59 |

Note:
[*1] Penetration impact strength, YE denotes yield point energy, TE denotes total energy, (D) and (B) indicate the states of fracture: (D): ductile fracture, (B): brittle fracture

TABLE 30-1

| Constituent Thermoplastic resin comp. No. | Modified polypropylene (A) MS-PP-2 | Saturated polyester resin (D) PBT-1 | Epoxy group containing copolymer (E) E.VA.GMA-1 | Modified ethylenic copolymer rubber (F) M-EPM-1 |
|---|---|---|---|---|
| Example 71 | 30 | 45 | 10 | 15 |

TABLE 30-2

Physical

TABLE 30-2-continued

| properties Thermoplastic resin comp. No. | Specific gravity | Melt flow rate (g/10 min) | Tensile properties | | Flexural properties | |
|---|---|---|---|---|---|---|
| | | | Strength at yield (kg/cm$^2$) | Elongation at break (%) | Modulus of elasticity (kg/cm$^2$) | Strength (kg/cm$^2$) |
| Example 71 | 1.060 | 0.7 | 262 | 85 | 12,200 | 376 |

| | Izod impact strength | | Penetration impact strength (YE/TE)[*1] | | Thermal deformation temp. (°C.) | Rockwell hardness H$_R$ |
|---|---|---|---|---|---|---|
| | 23° C. (kg · cm/cm) | −30° C. | 23° C. (J: joule) | −30° C. | | |
| | 13.0 | 6.0 | 11/11 (B) | 1.1/1.1 (B) | 118 | 91 |

Note:
[*1] Penetration impact strength, YE denotes yield point energy, TE denotes total energy, (D) and (B) indicate the states of fracture: (D): ductile fracture, (B): brittle fracture.

TABLE 31-1

| Constituent Thermoplastic resin comp. No. | Modified polypropylene (A) MS-PP-2 | Saturated polyester resin (D) PBT-1 | Epoxy group containing copolymer (E) E.MA.GMA-1 | Modified ethylenic copolymer rubber (H) M-EPM-2 | Polypropylene (B) PP-5 |
|---|---|---|---|---|---|
| Example 72 | 41 | 5 | 2 | 17 | 35 |

TABLE 31-2

| Physical properties Thermoplastic resin comp. No. | Specific gravity | Melt flow rate (g/10 min) | Tensile properties | | Flexural properties | |
|---|---|---|---|---|---|---|
| | | | Strength at yield (kg/cm$^2$) | Elongation at break (%) | Modulus of elasticity (kg/cm$^2$) | Strength (kg/cm$^2$) |
| Example 72 | 0.919 | 3.0 | 195 | >200 | 10,400 | 250 |

| | Izod impact strength | | Penetration impact strength (YE/TE)[*1] | | Thermal deformation temp. (°C.) | Rockwell hardness H$_R$ |
|---|---|---|---|---|---|---|
| | 23° C. (kg · cm/cm) | −30° C. | 23° C. (J: joule) | −30° C. | | |
| | 62.0 | 6.0 | 27/47 (D) | 10/11 (B) | 108 | 73 |

Note
[*1] Penetration impact strength, YE denotes yield point energy, TE denotes total energy, (D) and (B) indicate the states of fracture: (D): ductile fracture, (B): brittle fracture.

TABLE 32-1

| Constituent Thermoplastic resin comp. No. | Modified polypropylene (A) MS-PP-2 | Saturated polyester resin (D) PBT-1 | Epoxy group containing copolymer (E) E.MA.GMA-1 | Modified ethylenic copolymer rubber (H) M-EPM-1 | Modified ethylenic copolymer rubber (H) M-EBM-1 |
|---|---|---|---|---|---|
| Example 73 | 55 | 20 | 2 | 23 | — |
| Example 74 | 55 | 20 | 2 | — | 23 |

TABLE 32-2

| Physical properties Thermoplastic resin comp. No. | Specific gravity | Melt flow rate (g/10 min) | Tensile properties | | Flexural properties | |
|---|---|---|---|---|---|---|
| | | | Strength at yield (kg/cm$^2$) | Elongation at break (%) | Modulus of elasticity (kg/cm$^2$) | Strength (kg/cm$^2$) |
| Example 73 | 0.968 | 1.9 | 205 | >200 | 9,400 | 250 |
| Example 74 | 0.968 | 1.5 | 210 | >200 | 9,100 | 252 |

| | Izod impact strength | | Penetration impact strength (YE/TE)[*1] | | Thermal deformation temp. (°C.) | Rockwell hardness H$_R$ |
|---|---|---|---|---|---|---|
| | 23° C. (kg · cm/cm) | −30° C. | 23° C. (J: joule) | −30° C. | | |
| | 62.1 | 5.5 | 27/47 (D) | 0.2/0.2 (B) | 104 | 77 |
| | 63.2 | 5.0 | 28/47 (D) | 0.2/0.2 (B) | 102 | 79 |

Note:
[*1] Penetration impact strength, YE denotes yield point energy, TE denotes total energy, (D) and (B) indicate the states of fracture: (D): ductile fracture, (B): brittle fracture.

The modified polypropylene resin composition according to the present invention is not only good in molding processability but also markedly effective in that it can give molded products much superior in physical properties to those obtained from individual polymers constituting the thermoplastic resin composition.

The novel modified polypropylene resin composition provided by the present invention can easily be processed into a molded product, a film, a sheet or the like by a molding method usually used for molding thermoplastic resins, for example, injection molding, extrusion molding or the like, giving a product which has a very good balance among stiffness, heat resistance, impact resistance, scratch resistance, coating properties, oil resistance, chemical resistance, water resistance, etc., and is excellent in appearance uniforming and smoothness. It can be advantageously used for a purpose requiring especially high heat resistance and impact resistance, in particular, low-temperature impact resistance.

What is claimed is:

1. A modified polypropylene resin composition consisting of
   (1) 100 parts by weight of a resin composition consisting of
      (i) 1% to 99% by weight of at least one crystalline polypropylene resin (C) selected from the group consisting of
         (a) a modified polypropylene (A) obtained by graft copolymerizing onto a polypropylene (B) 0.01 to 10 parts by weight of an unsaturated carboxylic acid or the anhydride thereof and 0.01 to 10 parts by weight of an unsaturated aromatic monomer, per 100 parts by weight of the polypropylene (B), and
         (b) a composition comprising 5% by weight or more, based on the composition, of said modified polypropylene (A) and said polypropylene (B), and
      (ii) 99% to 1% by weight of at least one saturated polyester resin (D) comprising diol components and dicarboxylic acid components, at least 40 mole % of which are terephthalic acid,
   (2) 0.1 to 300 parts by weight of an epoxy group-containing polymer (E) which is
      (i) a copolymer of 99.9% to 50% by weight of ethylene and 0.1% to 50% by weight of at least one unsaturated epoxy compound selected from the group consisting of
         (a) glycidyl acrylate,
         (b) glycidyl methacrylate,
         (c) glycidyl itaconate,
         (d) allyl glycidyl ether,
         (e) 2-methylallyl glycidyl ether and
         (f) p-styryl glycidyl ether, and
      (ii) a copolymer of 99.9% to 50% by weight of ethylene, 0.1% to 50% by weight of the unsaturated epoxy compound as defined above and at least one ethylenically unsaturated compound selected from the group consisting of
         (a) vinyl acetate,
         (b) methyl acrylate,
         (c) ethyl acrylate,
         (d) methyl methacrylate,
         (e) vinyl chloride,
         (f) vinylidene chloride, and
         (g) isobutyl vinyl ether,
   (3) up to 5 parts by weight of a basic compound (F) optionally added as a reaction accelerator,
   (4) optionally, a filler (I) in an amount of an 0.01 to 300 parts by weight per 100 parts by weight of the resin composition (1), said polypropylene (B) being at least one crystalline polypropylene selected from the group consisting of
   (i) a crystalline propylene homopolymer,
   (ii) a crystalline propylene random copolymer which is a copolymer of propylene and at least one other alphaolefin, and
   (iii) a crystalline propylene block copolymer which comprises
      (a) a first segment containing a crystalline propylene homopolymer or a crystalline polypylene random copolymer of propylene and 6 mole % or less of at least one other alpha-olefin, and
      (b) a second segment containing a random copolymer of 10 mole % or more of ethylene and at least one other alpha-olefin,
said unsaturated carboxylic acid or the anhydride thereof being at least one member selected from the group consisting of
   (i) acrylic acid,
   (ii) methacrylic acid,
   (iii) maleic acid,
   (iv) itaconic acid,
   (v) maleic anhydride, and
   (vi) itaconic anhydride,
said unsaturated aromatic monomer being at least one member selected from the group consisting of
   (i) styrene,
   (ii) o-methylstyrene,
   (iii) p-methylstyrene,
   (iv) m-methylstyrene,
   (v) alpha-methylstyrene, and
   (vi) vinyltoluene, and
the content of the saturated polyester resin (D) in said modified polypropylene resin composition being less than 50% by weight.

2. A modified polypropylene resin composition consisting of
   (1) 100 parts by weight of a resin composition consisting of
      (i) 1% to 99% by weight of at least one crystalline polypropylene resin (C) selected from the group consisting of
         (a) a modified polypropylene (A) obtained by graft copolymerizing onto a polypropylene (B) 0.01 to 10 parts by weight of an unsaturated carboxylic acid or the anhydride thereof and 0.01 to 10 parts by weight of an unsaturated aromatic monomer, per 100 parts by weight of the polypropylene (B), and
         (b) a composition comprising 5% by weight or more, based on the composition of said modified polypropylene (A) and said polypropylene (B), and
      (ii) 99% to 1% by weight of at least one saturated polyester resin (D) comprising diol components and dicarboxylic acid components, at least 40 mole % of which are terephthalic acid,
   (2) 0.1 to 300 parts by weight of an epoxy group-containing polymer (E) which is
      (i) a copolymer of 99.9% to 50% by weight of ethylene and 0.1% to 50% by weight of at least one unsaturated epoxy compound selected from the group consisting of
         (a) glycidyl acrylate,
         (b) glycidyl methacrylate,
         (c) glycidyl itaconate,
         (d) allyl glycidyl ether, (e) 2-methylallyl glycidyl ether and (f) p-styryl glycidyl ether, and (ii) a copolymer of 99.9% to 50% by weight of ethylene, 0.1% to 50% by weight of the unsaturated epoxy compound as defined above and at least one ethylenically unsaturated compound selected from the group consisting of (a) vinyl acetate, (b) methyl acrylate, (c) ethyl acrylate, (d) methyl methacrylate, (e) vinyl chloride, (f) vinylidene chloride, and (g) isobutyl vinyl ether, (3) up to 5 parts by weight of a basic compound (F) optionally added as a reaction accelerator, and (4) 0.01 to 300 parts by weight per 100 parts by weight of at least one rubber selected from the group consisting of (i) an ethylenic copolymer rubber (G), and (ii) a modified ethylenic copolymer rubber (H) obtained by graft copolymerizing onto an ethylenic copolymer rubber (G) a monomer consisting of 0.5 to 15 parts by weight of an unsaturated carboxylic acid or the anhydride thereof per 100 parts by weight of the ethylenic copolymer rubber (G), (4) optionally, a filler (I) in an amount of an 0.01 to 300 parts by weight per 100 parts by weight of the resin composition (1), said polypropylene (B) being at least one crystalline polypropylene selected from the group consisting of (i) a crystalline propylene homopolymer, (ii) a crystalline propylene random copolymer which is a copolymer of propylene and at least one other alphaolefin, and (iii) a crystalline propylene block copolymer which comprises (a) a first segment containing a crystalline propylene homopolymer or a crystalline polypylene random copolymer of propylene and 6 mole % or less of at least one other alpha-olefin, and (b) a second segment containing a random copolymer of 10 mole % or more of ethylene and at least one other alpha-olefin said ethylenic copolymer rubber (G) being at least one ethylene-alpha-olefin rubber selected from the group consisting of (i) an ethylene-alpha-olefin copolymer rubber which is a copolymer consisting of 15% to 85% by weight of ethylene and 85% to 15% by weight of an alpha-olefin, and (ii) an ethylene-alpha-olefin-nonconjugated diene copolymer rubber consisting of a terpolymer of 15% to 85% by weight of ethylene, 85% to 15% by weight of an alpha-olefin and 3% or less by weight of a nonconjugated diene, said unsaturated carboxylic acid or the anhydride thereof being at least one member selected from the group consisting of (i) acrylic acid, (ii) methacrylic acid, (iii) maleic acid, (iv) itaconic acid, (v) maleic anhydride, and (vi) itaconic anhydride, said unsaturated aromatic monomer being at least one member selected from the group consisting of (i) styrene, (ii) o-methylstyrene, (iii) p-methylstyrene, (iv) m-methylstyrene, (v) alpha-methylstyrene, and (vi) vinyltoluene, and the content of the saturated polyester resin (D) in said modified polypropylene resin composition being less than 50% by weight.

3. A modified polypropylene resin composition according to claim 1, in which the filler (I) is present in an amount of 0.01 to 300 parts by weight per 100 parts by weight of the resin composition (1).

4. A modified polypropylene resin composition according to claim 2, in which the filler (I) is present in an amount of 0.01 to 300 parts by weight per 100 parts by weight of the resin composition (1).

5. A modified polypropylene resin composition according to claim 1, wherein in the modified polypropylene (A), the unsaturated carboxylic acid or the anhydride thereof to be graft copolymerized is maleic anhydride and the unsaturated aromatic monomer is styrene.

6. A modified polypropylene resin composition according to claim 2, wherein in the modified polypropylene (A), the unsaturated carboxylic acid or the anhydride thereof to be graft copolymerized is maleic anhydride and the unsaturated aromatic monomer is styrene.

7. A modified polypropylene resin composition according to claim 3, wherein in the modified polypropylene (A), the unsaturated carboxylic acid or the anhydride thereof to be graft copolymerized is maleic anhydride and the unsaturated aromatic monomer is styrene.

8. A modified polypropylene resin composition according to claim 4, wherein in the modified polypropylene (A), the unsaturated carboxylic acid or the anhydride thereof to be graft copolymerized is maleic anhydride and the unsaturated aromatic monomer is styrene.

9. A modified polypropylene resin composition according to claim 1, wherein the saturated polyester resin (D) is at least one member selected from the group consisting of polyethylene terephthalate and polybutylene terephthalate.

10. A modified polypropylene resin composition according to claim 2, wherein the saturated polyester resin (D) is at least one member selected from the group consisting of polyethylene terephthalate and polybutylene terephthalate.

11. A modified polypropylene resin composition according to claim 3, wherein the saturated polyester resin (D) is at least one member selected from the group consisting of polyethylene terephthalate and polybutylene terephthalate.

12. A modified polypropylene resin composition according to claim 4, wherein the saturated polyester resin (D) is at least one member selected from the group consisting of polyethylene terephthalate and polybutylene terephthalate.

13. A modified polypropylene resin composition according to claim 1, wherein the basic compound (F) is at least one organic amine compound selected from the group consisting of benzyldimethylamine and 2,4,6-tris(dimethylaminomethyl)phenol.

14. A modified polypropylene resin composition according to claim 2, wherein the basic compound (F) is at least one organic amine compound selected from the group consisting of benzyldimethylamine and 2,4,6-tris(dimethylaminomethyl)phenol.

15. A modified polypropylene resin composition according to claim 3, wherein the basic compound (F) is at least one organic amine compound selected from the group consisting of benzyldimethylamine and 2,4,6-tris(dimethylaminomethyl)phenol.

16. A modified polypropylene resin composition according to claim 4, wherein the basic compound (F) is at least one organic amine compound selected from the group consisting of benzyldimethylamine and 2,4,6-tris(dimethylaminomethyl)phenol.

17. A modified polypropylene resin composition according to claim 2, wherein in the modified ethylenic copolymer rubber (H) the unsaturated carboxylic acid or the anhydride thereof to be graft copolymerized is maleic anhydride.

18. A modified polypropylene resin composition according to claim 4, wherein in the modified ethylenic copolymer rubber (H), the unsaturated carboxylic acid or the anhydride thereof to be graft copolymerized is maleic anhydride.

19. A modified polypropylene resin composition according to claim 2, wherein the ethylenic copolymer rubber (G) comprises at least one member selected from the group consisting of (i) a copolymer of ethylene, and either propylene or butene-1 and (ii) a terpolymer of ethylene, either propylene or butene-1, and a nonconjugated diene.

20. A modified polypropylene resin composition according to claim 4, wherein the ethylenic copolymer rubber (G) comprises at least one member selected from the group consisting of (i) a copolymer of ethylene, and either propylene or butene-1 and (ii) a terpolymer of ethylene, either propylene or butene-1, and a nonconjugated diene.

21. A modified polypropylene resin composition according to claim 3, wherein the filler (I) is at least one inorganic filler selected from the group consisting of glass fiber, potassium titanate whisker, talc, mica and calcium carbonate.

22. A modified polypropylene resin composition according to claim 4, wherein the filler (I) is at least one inorganic filler selected from the group consisting of glass fiber, potassium titanate whisker, talc, mica and calcium carbonate.

* * * * *